United States Patent [19]

Bockman et al.

[11] Patent Number: 5,510,910
[45] Date of Patent: Apr. 23, 1996

[54] PRINTING WITH FULL PRINTER COLOR GAMUT, THROUGH USE OF GAMUT SUPERPOSITION IN A COMMON PERCEPTUAL SPACE

[75] Inventors: Francis E. Bockman; Paul H. Dillinger, both of San Diego, Calif.

[73] Assignee: Hewlett-Packard Company, Palo Alto, Calif.

[21] Appl. No.: 238,118

[22] Filed: May 3, 1994

Related U.S. Application Data

[63] Continuation-in-part of Ser. No. 878,931, May 4, 1992, Pat. No. 5,377,024.

[51] Int. Cl.$^6$ .................................................. H04N 1/46
[52] U.S. Cl. ............................................ 358/502; 358/520
[58] Field of Search .................................. 358/500, 501, 358/502, 523, 524, 518, 520; 395/129, 131, 132, 162, 163

[56] References Cited

U.S. PATENT DOCUMENTS

| | | | |
|---|---|---|---|
| 4,941,038 | 7/1990 | Walowit . | |
| 5,125,045 | 6/1992 | Murakami et al. | 358/456 X |
| 5,208,911 | 5/1993 | Newman et al. | 395/162 |
| 5,218,671 | 6/1993 | Liao et al. | 395/131 |
| 5,243,414 | 9/1993 | Dalrymple et al. | 358/500 |
| 5,257,097 | 10/1993 | Pineau et al. | 358/500 |

Primary Examiner—Betnsu Ro

[57] ABSTRACT

A technique of merging or "matching" hue pages of a CRT and printer is used to map CRT control signals through a common perceptual space into printer control signals. The system (1) receives a color specification expressed as CRT control signals, (2) locates the specified color within the CRT perceptual gamut, (3) normalizes the two gamuts in perceptual space, (4) determines the relative position of the same color in the normalized CRT gamut, (5) declares that position to be the relative position of that color in the normalized printer gamut as well, (6) unfolds the normalization to determine the absolute position of the color in the actual printer gamut, (7) expresses that position in terms of printer-control signals, and then (8) applies those signals to the printer, to print the specified color. As a result that color, and color changes, specified in terms of CRT control signals are tracked in terms of both printer control signals and actual printer performance. The two device gamuts are in effect mapped to each other; the full gamuts of both are in effect merged. This new mapping preserves relative positions in color space—and thus the capability of the printer to reproduce distinctions between colors seen on the CRT that appear very closely similar. Such discrimination between colors very adjacent in color space is supported nearly throughout gamuts of both devices, even very near the lightness extrema and maximum-saturation point on a hue page. To facilitate processing, the normalized characterizations for the CRT and printer gamuts (taken as triangular) are approximated for each of 360 hue pages by single-point data representing lightness and chroma at the saturation point—or normalized lightness at that point—plus two common lightness extrema for the gamut solid.

21 Claims, 15 Drawing Sheets

FIG. 2
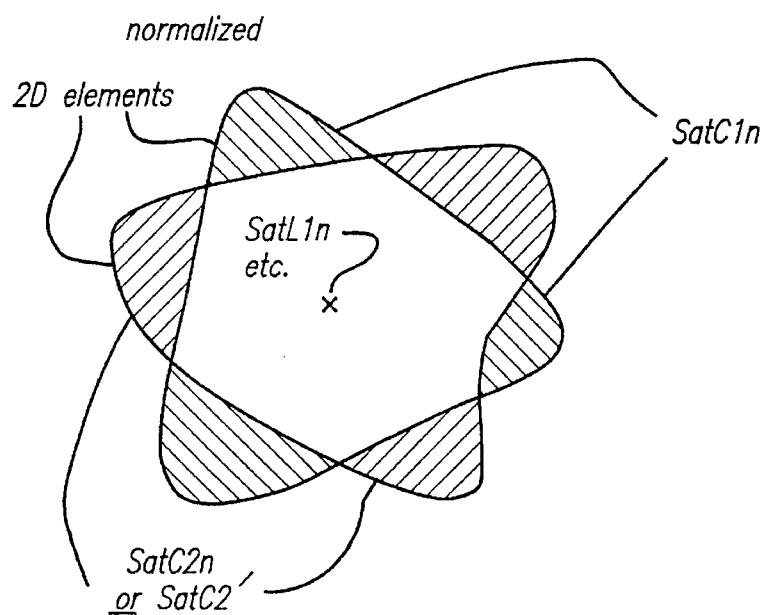
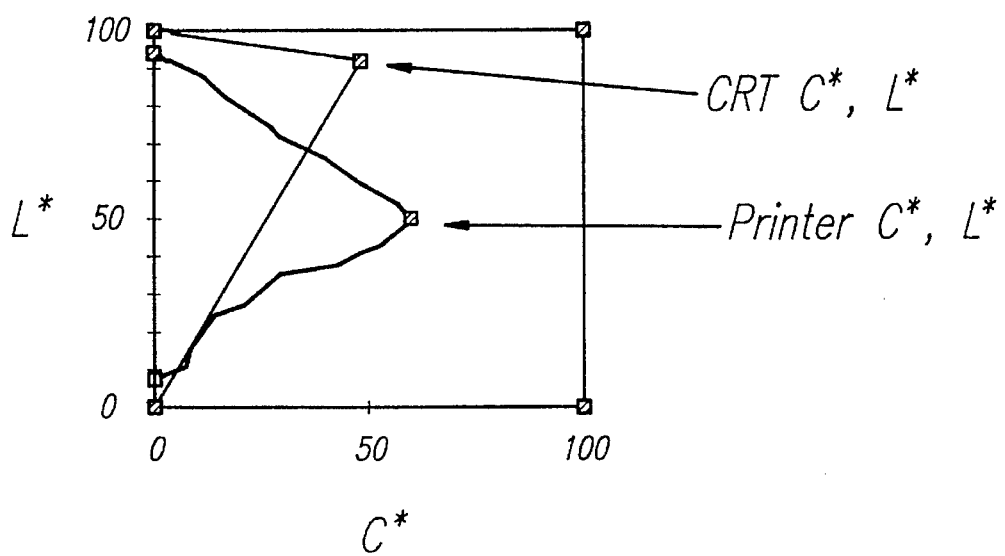
FIG. 7

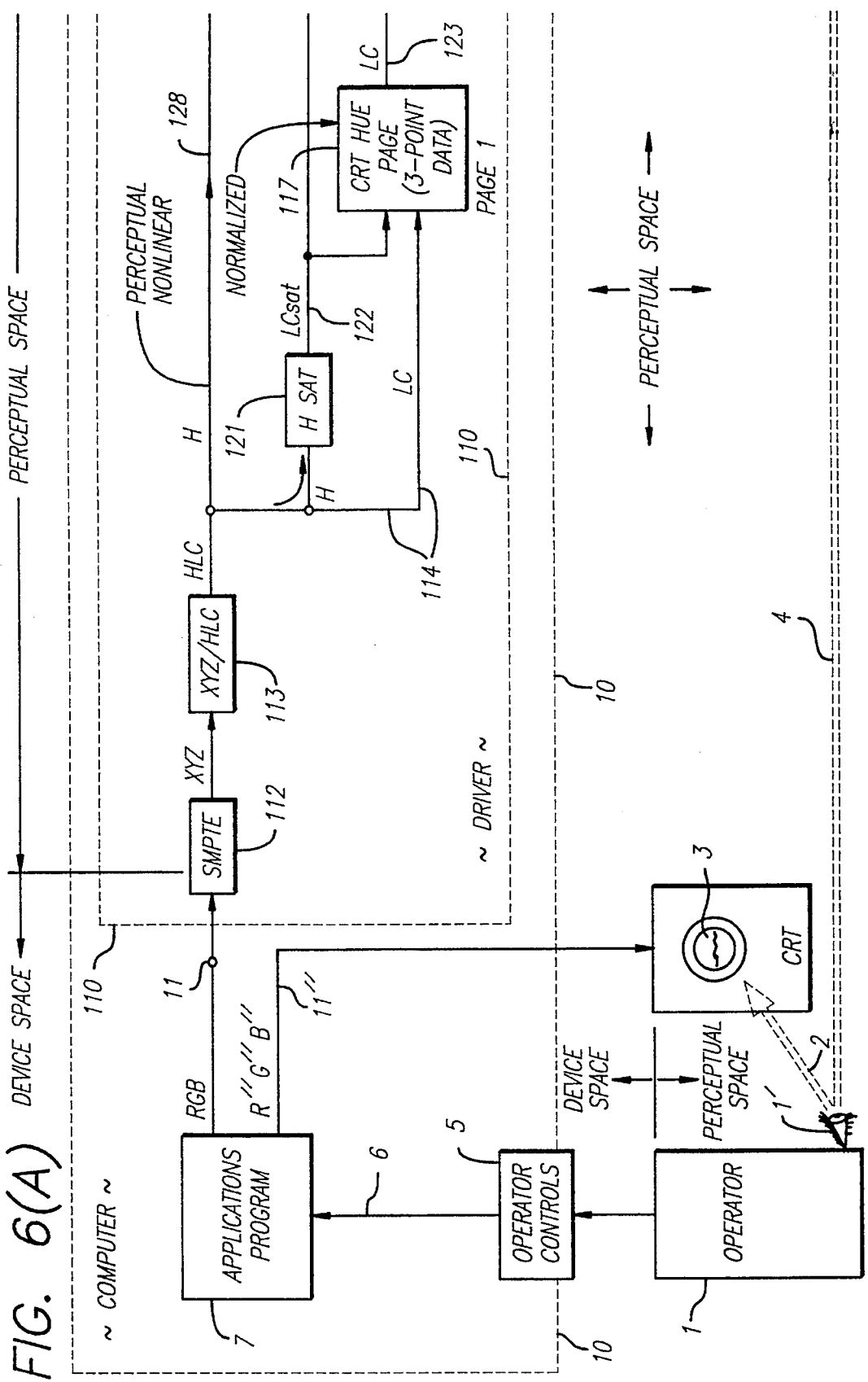

PRINTING WITH FULL PRINTER COLOR GAMUT, THROUGH USE OF GAMUT SUPERPOSITION IN A COMMON PERCEPTUAL SPACE

RELATED PATENT DOCUMENTS

This is a continuation-in-part of copending United States utility-patent application Ser. No. 07/878,931, entitled "APPARATUS FOR FORMING COLOR IMAGES USING A HUE-PLUS-GRAY COLOR MODEL", which was filed May 4, 1992, and issued on Dec. 27, 1994, as U.S. Pat. No. 5,377,024.

A related application filed concurrently herewith is Ser. No. 08/238,137, entitled "COORDINATING COLOR PRODUCED BY TWO DEVICES—USING A HUE-CONTROLLED MACHINE COLOR SPACE, OR SURFACE SCALING" and now still pending. Both the documents identified above are in the name of Paul H. Dillinger.

Another related application is Ser. No. 08/084,375, entitled "SYSTEM FOR CALIBRATING A COLOR DISPLAY TO ENABLE COLOR MATCHING", filed Jun. 29, 1993, in the names of Kirt A. Winter et al, and issued on Jan. 10, 1995, as U.S. Pat. No. 5,381,349. All three documents mentioned above are assigned to the assignee of the present application; and in their entirety are hereby incorporated by reference into the present document.

BACKGROUND

1. Field of the Invention

This invention relates generally to color presentation by different devices— for example different printers, cathode-ray tubes (CRTs), and liquid-crystal displays (LCDs)—and more particularly to coping with divergent color gamuts of such color-presenting devices, when color specifications developed with one device are used to control color presentation on another device.

An exemplary application is in controlling color presentation by a printer, based on color specifications developed using a CRT computer monitor.

2. Related Art (a) Coexistent machine color spaces—The use of color monitors for computers has accelerated the need for color printers which can produce a satisfactory printout of what is displayed on the screen. As suggested above, this is one important instance of coordinating color appearances produced with two different physical systems.

With all such equipment, determining what constitutes a "satisfactory" color presentation—for instance, color printout on a printing medium such as paper—is often quite problematic.

Part of this problem arises from the subjective nature of color. Color is a sensation produced by the combined effects of light, objects and human vision. A particular color or combination of colors may be appealing to one person while at the same time being offensive to another.

Another part of the "satisfactory"-color definitional problem arises from the different color technologies used in computer monitors, color printers, and other color-presenting devices such as for example broadcast or tape-recorded video. In general these technologies diverge dramatically.

For example, color presentation by CRT computer monitors and television sets is based on a color gamut defined by red, green and blue (RGB) CRT intensities. Color presentation by printers such as inkjet printers is instead typically based on a color gamut defined by cyan, magenta, yellow and black (CMYK) printed-page colorants.

The RGB color intensities of CRT screens are combined together in an additive way by mixing red, green and blue light rays from a first class of physical substances—namely phosphors—to form a first variety of different colors. The CMYK components of color inks, a second and entirely different class of physical substances, are applied to media in different combinations in a subtractive way to form a second variety of different colors; and the three chromatic elements CMY are only nominally the complements of the RGB intensities.

Various different color-management techniques have been used to provide some, form of coordination between, for instance, the colors viewed on a computer monitor and the colors printed by a Specific printer using a given ink formula on a particular type of printing medium. Modernly, most such control regimes are implemented in computer software or device firmware, or both.

Some color-matching technology has been incorporated into printer drivers, and in some such cases partially into accompanying lookup tables. A driver provides a translation interface between—on one hand—a particular computer operating system, and/or application software running in the computer, and on the other hand a color printer which acts as a hardcopy output device.

Portions of this document refer to an "input device" or "source device". By this is meant a device in reference to which a set of color-image specifications has been developed—not necessarily a device within which specifications literally originate.

Quite commonly, for example, a person watching a CRT screen (here serving as the input device) creates or modifies specifications for the colors, as seen on the screen, of various image portions, respectively. A printer or other device may be used instead of a CRT as the input device, even though naturally CRT screens are in general much faster and so in most cases preferred for this purpose—and conversely a CRT may be an output device.

It will be clear to readers who are skilled in this field that the CRT screen or other input device is not literally the source of the specifications. Rather, the source of the specifications is usually the person, typically in interaction with some apparatus or computer program— often a so-called "applications" program.

Such apparatus or program receives the person's commands, translates them into display-device signals and causes them to be displayed on the CRT screen. The physical properties (or so-called "characterization") of the CRT enter into the determination of how the specified colors will appear.

Once created or modified, or both, specifications are commonly directed into control systems for operation of another device—the "output device" or "destination device"—often a printer. Thus in may cases both the "input device" and "output device" in common are recipients of the specifications, in the form of data, electrical signals etc.— and the differences between physical properties or "characterizations" of the two devices in general give rise to differences between the resulting color appearances.

Terms such as "source device" or "input device" in this document thus encompass color-presenting devices which may be used by a person in conjunction with developing color-image specifications. These terms also, however, encompass devices that actually do serve as the source of the specifications.

An instance of this which is of particular interest is an applications program or system which leaves—as some do—the CRT signals or data essentially unaltered. In such a case the information in substantially the same form as used to control the CRT is treated as, or may be regarded as, the color specifications.

(b) Pipe-through systems—In designing control systems for early apparatus, a classic assumption was sometimes used that the red, green and blue (for example) of one system were compatible, or consistent, with the red, green and blue complements of the cyan, magenta and yellow (for example) of another system. These assumptions are grossly incorrect, but had several interesting and useful properties.

First, the assumptions and resulting conversions were simple and required little understanding of relationships between the different color-production mechanisms used in the different systems. In particular these assumptions sidestepped all inquiry into the color gamuts respectively available with the two systems, and so into the relationships between those gamuts.

Therefore these assumptions were very easily implemented. In essence the RGB data were simply piped through to form CMYK data—but with elementary conversions based on the previously well-taught oversimplifications of so-called "complementary" colors; and also with some side calculations to derive black-ink (K) quantities.

Second, seen from the more-modern perspective of gamut relationships, these assumptions had the technical or theoretical benefit of in essence forcing both gamuts into concurrence, thus completely using both color spaces. They perfectly superposed the source—and output-device gamuts, thus producing colors with—potentially—a full range of vividnesses and lightnesses.

Third, viewed from a simple perceptual standpoint, these assumptions did produce color presentations for output devices (e.g., usually printers) that were usually distorted in relation to the colors presented by the input devices (e.g., usually CRTs). The relationship was generally quite poor—suffering from severe errors in hue and chroma, usually obscured by even more severe errors in lightness.

Because apparatus users found these lightness errors unacceptable, system designers next proceeded to incorporate lightness/darkness adjustments into the otherwise piped-through signals. These adjustments were sometimes labeled with such words as "lightness" and "darkness".

Sometimes they were instead called adjustments in "contrast" and designated by the corresponding parameter "γ" (a lower-case Greek letter "gamma")—a classical variable in photography, photolithography and photometrics. In either case these adjustments were often actually implemented in the classical manner as γ slopes in a logarithmic response space.

In any event, lightness/darkness corrections generally took the form of separate adjustments—generated painstakingly through trial-and-error—to red, green and blue input signals. Through these efforts, lightness as presented by an output device could be brought into an acceptable range of relationships with that presented by an input device.

Another result, however, as the residual of this process was to reveal the theretofore-unaddressed deviations in hue and chroma. With lightness errors under relatively better control, these chromatic errors became far more conspicuous—and they are much more difficult to master.

(c) Overlapping gamuts—In later apparatus some effort was addressed to controlling the relationship between these perceptual chromatic elements (hue and chroma) of input- and output-system colors. This effort generally took the form of attempts to match the appearances of the two.

This step entailed analytically characterizing the two devices—e.g., CRT and printer—in some common perceptual space. At this point the physical reality of the differences between the two sets of colors and the two device gamuts came out, disclosed by the perceptual frame of reference.

Now for the first time it became meaningful to consider the matter of dealing with gamut divergences. In general the gamuts of any two different devices fail to be congruent, and in particular often are overlaping—in all three dimensions of color space.

Thus typically each of the two gamuts extends to more-vivid colors, in some parts of the lightness ranges and some parts of the hue spectrum, than does the other gamut. Moreover, typically one gamut extends to lighter or to darker colors, or to both lighter and darker colors, than does the other gamut.

This overlap phenomenon implies, for example, that some colors which can be displayed on a CRT simply cannot be printed on a printer. It also has a converse implication (which will be introduced shortly)—but the unavailability of printer representations for some CRT-representable points is a particularly demanding matter.

It is demanding because color specifications developed by a person operating a CRT will in general include data points that are outside the printer gamut—but yet must be processed in some way. Thus system programmers, whether they wish to make color-relationship decisions or not, are forced to instruct systems what to do with those out-of-gamut points.

Faced with this necessity, system designers devised one or another scheme for translating the furthest-out-of-gamut CRT color into the interior of the printer gamut. A natural concern in specifying such a scheme is how to retain some degree of consistency in dealing with all colors—in other words CRT color-data points that are within the printer gamut, as well as different points that are outside it.

This idea of consistency is very important, particularly in presenting color images that include pictures, intended to appear realistic, of physical objects. Pictures of objects often derive a degree of realism through preservation of color relationships between colors of physically nearby image elements, such as for instance adjacent portions of subtlely-shaded clouds, or of the surfaces of curved objects. Another way to refer to preserving such "relationships" is to speak of retaining "information content".

A classical example of the relationship-preserving or information-content-retaining challenge has been denominated the "gum-ball problem". This phrase conjures the difficulty of realistically presenting a color picture of an object whose portrayed curvatures extend through a full range of values from flat-on to tangential.

As is well known, realistic portrayal of curvatures generally requires reproduction of a continuum of surface shadings—without which surfaces tend to appear, literally, flat. Attaining such realistic presentation is particularly difficult for a vividly colored object such as a gum ball.

The necessary shadings needed to realistically portray curvatures are especially demanding for vividly colored objects because these colors are near the peripheries of overlapping-gamut systems. In particular, often, these colors are within the source-device gamut but outside the destination-device gamut.

The difficulty arises from the need to somehow preserve as much as possible of the relationships between these many different shadings found in the source-device gamut—even when they are all outside the output-device gamut. The question then is how to represent, within the capabilities of an output device, relationships between many different vivid-color appearances that are all, by definition, outside those capabilities.

(d) Gamut compression—One standard solution to these concerns heretofore has been to make a portional adjustment to the chroma, or distance from the central lightness/darkness axis of the three-dimensional color-solid gamut, for all CRT-defined points. A common variant of this technique is proportional adjustment to both chroma and lightness—the latter being represented as position projected along that central axis.

The chroma-adjusting proportionality factor in such systems is less than unity, and is generally constant. Usually the proportionality factor is constant throughout the entire three-dimensional gamut; possibly in some systems, however, that factor is at least constant throughout each so-called "hue page", or defined grouping of hue pages.

(A hue page, as considered within any single specified color space, is a vertical plane extending radially outward from the central color-space axis of lightness/darkness, and representing the available variations of chroma and lightness that make up all the available colors of a selected single hue. As between different color spaces, the hue-page concept has important limitations which are discussed in section [d] below.)

The selection of a constant proportion throughout the color space may be an intuitively satisfying choice, since its physical implication is in theory a mapping of all colors with no change in lightness or hue, only a change in vividness—and since, furthermore, at least in an analytical sense this vividness change is applied consistently to all the colors in the CRT gamut.

Thus the various colors retain nearly their original lightness and hue, and also retain their mutual relationships in a comparative way. For example, if a first color on the CRT screen is originally darker, bluer and more saturated than a second on the CRT screen, then in principle the resulting, first color printed on paper should likewise be darker, bluer and more saturated than the resulting second color printed on paper—and a like relationship should be exhibited for any selected pair of colors.

One variant of this proportional-adjustment technique is to incorporate accompanying lightness adjustments, or often lightness/chroma tradeoffs (which themselves may or may not operate on the same principle of proportionality). These adjustments are provided to avoid some intuitively unsatisfying results of proportionally adjusting chroma exclusively.

All such proportional-adjustment techniques, sometimes known as "gamut compression", nevertheless have drawbacks. One relatively minor problem is that the theoretically consistent character of the transformation is not in general observed for real systems; in other words, the vividness compression is sometimes perceptually nonuniform.

More serious and fundamental is the fact that gamut compression artificially restrains the vividness of almost all the colors printed. The only colors in the CRT gamut which are printed near the full vividness of which the printer is capable are (1) the CRT color which is furthest out of the printer gamut and (2) the near-neighbors of that CRT color.

Even that furthest-out-of-gamut color is, by definition, very significantly reduced in vividness from what is seen on the CRT screen—but this cannot be helped because the printer gamut at this point does in fact limit the available vividness. Everywhere else in the printer gamut, however, the capability of the printer to present saturated, vivid colors is essentially discarded.

Thus in essence all the colors in the CRT screen gamut are synthetically and systematically reduced to the lowest common denominator, so to speak, of the printer gamut. One result has been to create among many users a misapprehension that CRT screens are capable of displaying colors vividly whereas CMYK printers are not.

As to printers the contrary is true—but the colors which printers can print vividly are different colors from those which CRT screens can display vividly. This is the "converse implication" mentioned parenthetically above.

To state that converse implication directly: some colors which can be printed on a printer simply cannot be displayed on a CRT. Evidence of this fact heretofore was, in effect, inadvertently concealed from many users by the popular technology of color-matching and gamut compression.

Thus in inventing gamut compression to solve the earlier problems of lightness and hue shifts in printed colors, relative to CRT-displayed colors, system designers created a new problem: printed colors which failed to make use of the printer gamut and so appeared—in comparison with CRT displays—drab, lifeless, boring, and generally disappointing to users of color-presenting apparatus.

Gamut compression, while serviceable in many contexts, thus failed to provide a technique for presenting such colors in a manner that is both fully useful (retaining information content, to a reasonable extent) and perceptually vibrant.

An earlier passage in this discussion posed the problem of "how to represent, within the capabilities of an output device, relationships between many different vivid-color appearances that are all, by definition, outside those capabilities." To that expression of the problem may now be added the additional constraint that the desired representation should at the same time preserve, to the extent possible, the vividness of the original colors.

The gum-ball problem, after all, is easily solved in the limiting case of black-and-white pictures—or whenever vibrant color is of little consequence. The challenge resides in concurrently retaining the vividness of the bright colors used in making the balls.

(e) Surface scaling—Another line of effort has focused more emphatically on this latter constraint. Unfortunately, as will now be seen, the result has been to sacrifice a large part of the information-preserving or relationship-preserving concern.

Here the technique entails generally maintaining essentially unchanged the colors within the common portions of the input and output gamuts. Adjustments are applied exclusively—or almost exclusively—to those specified colors which are within the source-device gamut but found to be outside the destination-device gamut.

These adjustments consist of mapping, or moving, all those specified colors to some points along the destination-device gamut surface. In this line of development, known as "surface scaling", various rules have been adopted by various workers for selecting the new point along the output-gamut surface to assign to each given out-of-gamut color.

At the outset it will be understood that considerable loss of information is necessarily inherent in any such exercise, for at heart it consists of mapping areas into lines. Nonetheless the effort is entirely meritorious because retention of vividness is very important.

In fact, for many users vividness of the final presented color is at least as important as, and sometimes more important than, the retention of intercolor relationships and thus information conveying, e.g., spatial curvatures of objects portrayed. A major issue, then, is the extent to which the appearance, or even illusion, of seeming to retain such relationships can be sustained.

One straightforward kind of surface scaling is mapping colors to the output-gamut surface at constant lightness— in other words, displacing each out-of-destination-device-gamut point along a horizontal (constant-lightness) line to the intersection of that line with the gamut boundary. Intellectually this may seem the optimum arrangement, since it preserves lightness, and operationally may be appealing in that it is very simple to implement.

Unfortunately, however, because of the relative geometries of gamut boundaries, this approach tends to preserve relatively very small fractions of the relationships between out-of-destination-gamut colors. In other words this approach typically retains very small fractions of the information needed to distinguish different parts of objects.

Consideration of typical device-gamut shapes, particularly within hue pages, reveals why this is so. Device gamut boundaries as represented in perceptual spaces, in the usual lightness-vs.-chroma hue-page geometry, typically lie neither near-horizontal nor near-vertical but rather middlingly in between.

Hence a horizontal (along-constant-chroma) displacement of out-of-destination-gamut points approaches the destination-gamut boundary along an acute angle. The result of using this particular form of area-to-line mapping is to map a very long, horizontal line (within the out-of-gamut areas) into each point on the destination-gamut surface.

Similar objections may be lodged against a competing candidate mapping—namely, along vertical (constant chroma) lines. While perhaps not as often sacrificing as much information content in general, such a mapping tends to collapse multiple values of lightness onto each gamut-boundary point.

This particular sort of information deformation is particularly troublesome: first, it flattens apparent shapes of curved surfaces. Second, it also draws attention to itself by introducing relatively severe lightness shifts per se—and, as previously suggested, shifts in this color dimension are particularly noticeable and objectionable.

Mindful of these relationships, some workers choose instead to map each out-of-gamut color point to the nearest point on the gamut boundary. For much of the out-of-gamut area this amounts to displacing the color points along a normal to the boundary, which—considering typical overlapping-gamut geometries—can be seen to minimize the length of displacement.

In this way, still for much but not all of the out-of-destination-gamut area, this mapping geometry tends to maximize the extent of relationship/information retention. In certain areas of the hue page, however, the mechanism leading to this benefit tends to break down.

Those include, first, the areas in which there is no normal to the gamut boundary, and second the areas which are adjacent to those areas. Study of hue-page graphs for typical overlapping-gamut situations will reveal that these conditions can usually obtain only in relatively small hue-page regions.

These are the regions near the maximum-saturation point and the lightness/darkness-extremum points for the destination gamut. From the localization and smallness of these effects it might be supposed that they are correspondingly of little consequence.

To the contrary, as a practical matter it is found that the quality of mapping in these areas is particularly important to the user. Areas near the maximum-saturation point are of particular concern to users generally, as the earlier presentation of the "gum-ball problem" makes evident.

Mapping performance in areas near the extrema of darkness and lightness implicates the capability of an image-presentation system to preserve image information or detail only in very dark and very light parts of the image. As such, image appearance in these selected areas may seem an obscure criterion.

Such a criterion may perhaps be of greatest concern only to relatively more-discerning users, but of these there are plenty. Furthermore, classical evaluations of image-presenting technologies from oil painting through photography and photolithography have concentrated attention upon these criteria.

With this in mind, one may go on to notice an important phenomenon of surface scaling by application of any algorithm that maps to the nearest surface point. In the out-of-gamut regions near the three extremum points, those extremum points tend to act as lightning rods, collecting all the colors from diverging, sector-shaped regions outside the destination gamut.

It is fair to conclude that surface-scaling techniques of the to-the-nearest-boundary-point type leave considerable room for improvement with respect to image-presenting quality in these critical regions of the color space.

(f) Data storage and processing requirements—Heretofore the amount of data needed for useful characterization of hue pages in machine or perceptual color spaces has bordered on the massive.

In some cases characterizations have taken such forms as, for instance, point-by-point perceptual chroma and lightness values corresponding to RGB data triplets or other machine-space data. Typically these values are tabulated for each point in a grid covering the entire interior of a hue page (or other color-space element) of interest.

In other cases characterizations have taken the form of point-by-point descriptions of upper and lower gamut boundaries for each hue page of interest. Here the amount of data required is less than in the full-interior characterization just mentioned, but still unwieldy.

Even with such multipoint characterizations, considerable operating time typically must be devoted to interpolation, in three color-space dimensions, between the table entries. Thus operating-time cost is added to the cost of data storage.

In still other cases perhaps there has been put into use, for characterizing chroma and lightness within a hue page, some multiterm polynomial expansion that satisfies boundary values for each hue page of interest. This may be an improvement, but has some tendency merely to replace near-massive data storage with near-massive data processing—a substitution that sawes disc space only at the cost of time and throughput penalties.

For some purposes, detailed and accurate lookup tables, or calculations good to three or four places, seem serviceable and in some cases perhaps even unavoidable. A methodology, however, heretofore has been severely needed for at least mitigating this brute-force approach to machine- and perceptual-space characterizations, wherever extremely high precision or accuracy is not fundamentally necessary.

(g) Summary—Thus there has been heretofore a need for a refined color-management technology which somehow permits use of the full color-saturating capability of printers. It is desirable that such a technology at the same time preserve at least some of the acknowledged benefits of color-matching, and of its perhaps most-popular implementation, gamut compression.

For example, again with respect to CRT/printer systems, the related art provides no system for printing well-saturated color in conjunction with:

at least approximate preservation of the lightness relationships in a CRT-displayed image; or preservation of what may be called "information"—meaning the discrimination between initially adjacent colors, with at least some preservation of the hue and of the relative, if not absolute, lightness and vividness magnitudes—in a CRT-displayed image.

Now couching these same problems in broader terms, the need is for—in operation of a destination or target color-presenting device— at least approximate preservation of the lightness relationships in a corresponding image produced by a source color-presenting device; or preservation of information in the source color-presenting device.

In principle the source and destination devices may be two different kinds of printers, or two different kinds of computer monitors (e.g., one an LCD screen), or the source device a printer and the target or display screen, or one device a broadcast or tape-recorded video monitor and the other a lithography system, etc.

It will be recalled that the early, classical system of, in essence, directing source-device signals to output-or destination devices did have one technical advantage: the gamuts of the two devices were fully and perfectly superposed. Satisfying this condition ensures complete gamut usage (including vivid colors) and complete information preservation.

It is accordingly desirable in a modern system to restore some such relation—but not perceptually willy-nilly as in the early systems. Rather instead gamut superposition should be effected in a manner that somehow incorporates a perceptual frame of reference, to provide better hue control and some more-acceptable degree of lightness control than in those early systems.

In addition it is desirable to provide methodology for avoiding heavy usage of memory and processing time where not really essential. This is particularly important as to transformations within hue pages.

As can now be seen, important aspects of the technology which is used in the field of the invention are amenable to useful refinement.

SUMMARY OF THE DISCLOSURE

The present invention introduces such refinement. Before offering a relatively rigorous discussion of the present invention, some informal orientation will be provided here. It is to be understood that these first comments are not intended as a statement of the invention.

Some aspects of the invention enable printing (more generally, presentation of images on an output or destination device) with very vivid colors—and at the same time with minimum loss of color relationships or color information as defined above.

Some aspects of the invention remove the problem initially introduced by resort to perceptual space for coordinating colors presented by different devices—namely, the problem of separated gamuts. These aspects of the invention provide both superposed gamuts and perceptual relationships concurrently.

Some aspects of the invention enable simplified, streamlined manipulations of color points within hue pages. Related aspects account for hue-page characterizations adequately—in many selected situations—without resort to heavy commitment of data or processing.

Now with these preliminary observations in mind this discussion will proceed to a perhaps more-formal summary. The present invention has more than one main aspect or facet; these primary facets or aspects are amenable to use independently of one another, although for optimum enjoyment of all the benefits of the invention they are preferably practiced together.

Following are summaries of the preferred embodiments of each of these major facets of the invention considered in turn.

1. In preferred embodiments of this aspect of the present invention, the invention is a method for presentation of a color image in a form viewable as a color image. The method uses a color-image presentation device.

This method includes the step of interpreting relative-position values of color parameters, within a first color element of at least two dimensions, as also being relative-position values of corresponding color parameters within a second color element of the same number of dimensions. By "color element" is meant a three-dimensional relationship in color space, or a two-dimensional relationship ("surface") in that space.

As will be seen, this step entails establishing certain color-parameter values by manipulations based upon the physical significance of the first color element—and then treating or using those parameters as if their physical significance were related to the second color element, It may thus be regarded as a renaming or assigning step, and as will be seen has application in a number of different situations and for a number of different purposes.

The method also includes the steps of using the relative-position values within the second color element to derive signals for controlling the color-image presentation device; and then applying the signals to operate the color-image presentation device for presentation of the color image in viewable form.

With respect to this main aspect of the invention, some particularly preferable embodiments may be mentioned here. In one group of these embodiments, the first color element is expressed in terms of a perceptual color space, and the second color element is expressed in terms of a device color space.

In this case the interpreting step can be used to produce the physical effect of translating perceptual-space values within the first color element into device-space values within the second color element. Very large savings in data storage or processing time, or both, can be obtained in this way.

Still with respect to the same main aspect of the invention but in another group of embodiments, the first color element is expressed in terms of a first perceptual color space—and the second color element is expressed in terms of a second, different perceptual color space. In distinction to the first group of embodiments introduced immediately above, here both elements are in perceptual spaces.

In this case the interpreting step can be used to produce an entirely different physical effect, namely matching of the first color element to the second color element to provide substantially full use of the second color element. For example the first color element may be at least part of a color gamut of a first presentation device, and the second color element at least part of a color gamut of a second, different presentation device; this use of the interpreting step matches the gamuts to provide substantially full use of the color gamut of the second device.

2. In preferred embodiments of this next primary facet of the invention, the invention is a method for processing information to control a color-image-presentation device. The device presents color images in a form viewable as color images.

This method includes the step of receiving or developing color-image specifications defining a desired image. At least some of the specifications are expressed in terms of a hue page.

Another step is finding vertex coordinates for a straight-line-bounded figure representing a simplified shape of the hue page of interest. Yet another is characterizing the hue page in terms of the vertex coordinates.

Further steps are expressing the specifications with reference to the vertex coordinates, and then manipulating the specifications as thus expressed with reference to the vertex coordinates. The method also includes the step of then applying the manipulated specifications to operate the presentation device for presentation of the image in a form viewable as a color image—including control of colors as seen in the image.

With respect to this main aspect of the invention too, some particularly preferable embodiments will be mentioned here. In one group of these embodiments the straight-line-bounded figure is a triangle; in this case the vertex coordinates represent, respectively, the maximum-saturation point, the maximum-lightness point, and the minimum-lightness point.

Further particularly preferable embodiments of this main aspect of the invention include employing extremum (minimum and maximum) lightness points common to all hue pages. When combined, for example, with use of the triangular simplification mentioned above, this particular simplification leads to single-point characterization (lightness and chroma for maximum chroma, or normalized lightness for normalized saturated chroma) for each hue, plus a two-point lightness characterization for the three-dimensional gamut.

3. In preferred embodiments of this primary facet of the invention, the invention is a method of presenting color images using a color-presentation device. It includes surface-scaling a multiplicity of color points that are outside the gamut of the device.

This method includes performance of steps that have the effect of defining a point within the device gamut, and then constructing a line that joins an out-of-gamut color point with that defined point. It also includes the step of then determining the intersection of the constructed line with the gamut boundary.

In addition the method includes the step of scaling the out-of-gamut point to that intersection to determine a surface-scaled color specification corresponding to the out-of-gamut point. Thus as can be understood this invention provides a new kind of surface scaling by radial movement toward (but not to) a point within the gamut; in view of this radial pattern of data displacement the internal defined point may be conveniently denominated a "pivot point".

The method also includes repeating the constructing, determining and scaling steps with respect to a multiplicity of other out-of-gamut points. Using the present invention, these out-of-gamut points are stopped at distinct, different points arrayed along the boundary.

In earlier surface-scaling systems, as will be recalled from the description offered in the related-art section, each of three extremum points on (not inside) the gamut boundary is forced into the role of collecting a large number of out-of-gamut points from an area. Whereas it cannot be avoided in surface scaling to map an area to a line—and thus a line to a point—it is objectionable on information-preserving grounds to map an area to a point.

The method also includes the step of applying the surface-scaled color specifications, for the multiplicity of points, to control presentation of the corresponding colors by the color-presentation device.

With respect to this main aspect of the invention, some particularly preferable embodiments will be mentioned here. In one group of these embodiments at least one other point—"pivot point"—is defined within the gamut. Certain of the out-of-gamut points are scaled in the same radial fashion toward one internal pivot point, other out-of-gamut points toward another internal pivot point.

Preferably the out-of-gamut area is divided into regions or zones, defined to make explicit which pivot point is to be used for each out-of-gamut point. It is preferred to do this in a manner which results in a reasonable degree of continuity of the spatial reassignment or mapping.

Also preferably not all out-of-gamut points are scaled toward pivot points in the radial pattern described here. It is preferred, for example, to scale out-of-gamut points in some zones parallel to a line—a zone-boundary line, for instance. It will be seen that this technique often serves better in extended segments of the gamut boundary that are relatively remote from the troublesome extrema.

4. In preferred embodiments of yet another main facet of the invention, the invention is a method for presentation of a color image in a form viewable as a color image. This method uses an output color-image presentation device that has an at least partly known gamut.

The method is based upon initial color specifications developed for use in an input color-presentation device that has a different at least partly known color gamut. These initial specifications are expressed in terms related to control of the input device.

This method includes the step of establishing a first relationship between input color specifications, expressed in terms related to control of the input device and corresponding colors, expressed in perceptual terms, presented by the input device. It also includes the step of establishing a second relationship between colors, expressed in perceptual terms, and output color specifications expressed in terms related to control of the output device.

Further the method under discussion includes the step of combining the effects of the first and second relationship to determine a third relationship between input and output color specifications, respectively in terms related to control of these two devices. In this method, the third relationship maps an input color specification for control of the input device into an output color specification for control of the output device, such as to present a perceptually corresponding color on both devices.

In addition the method includes the step of applying the initial specifications, altered by use of the third relationship, to operate the output device. The output device is thus used for presentation of a color image in a form viewable as a color image.

5. In preferred embodiments of a still further major facet or aspect of the invention, the invention is a method for presentation of a particular desired color image in a form viewable as a color image. This method, like the method just discussed, uses an output color-image presentation device that has an at least partly known gamut, and proceeds based upon initial color specifications developed for use in an input color-presentation device that has a different at least partly known color gamut. Here too the initial specifications are expressed in terms related to control of the input device.

The method includes the step of receiving the initial specifications, expressed in terms related to control of the input device, for a particular desired image. It also includes the step of referring to a tabulation which maps input color specifications for control of the input device into output color specifications for control of the output device—such as to present perceptually corresponding colors on both devices.

Further this method includes the step of finding, from the tabulation, new color specifications—for presentation on the output device—of colors perceptually corresponding to the initial specifications, for the particular desired image. An additional step of this method is applying the new color specifications to operate the output device for presentation of the image in a form viewable as a color image.

6. In preferred embodiments of this next primary facet of the invention, the invention is a method for printing a color image composed of multiple image points. The printing is performed with a color printer that has an at least partly known characteristic color gamut, and is based on color specifications from a source device that has an at least partly known characteristic color gamut.

Here the method includes the step receiving or developing a color specification for a portion of the image expressed in terms for control of the source device. The method also includes the step of performing on the color specification a transformation that has the effect of performing these substeps:

determining the position of the color specification within a first color gamut, superposing, at least approximately, elements of that color gamut and a second color gamut, and using the at-least-approximate superposition, and using the color-specification position, to define a new color specification for the same portion of the image.

The method also includes the step of then applying the new specification to control printing of the particular image portion by the printer.

Now in particularly preferable embodiments of this main aspect of the invention, this method is used for scaling from one hue page in perceptual space to another—not necessarily in the same perceptual space. In some such embodiments hue preferably is used as a correlating factor.

In other particularly preferable embodiments, the described method is used for scaling between hue pages in two machine spaces (e. g., monitor and printer)—in either direction—or between a perceptual and a machine space, still in either direction. In yet other preferable embodiments, perceptual proportionality is used as a means of scaling a data point from one hue page to another.

7. In preferred embodiments of this next primary facet of the invention, the invention is a method for printing a color image portion. The printing is done with a color printer that has a color gamut—that gamut being at least partly known.

For purposes of defining this method, it does not matter whether the image portion is an individual pixel or group of pixels, or an area printed as a solid—or even composites of these possibilities. In other words the image portion may take any of these forms, or still others.

The printing of the image portion is based on initial color specifications for use in a display device that has color gamut likewise at least partly known. The method includes the step of performing on these initial specifications a transformation that includes the effect of performing these substeps:

interpreting relative-position values of lightness and chroma, within a display-device hue page that is part of a display-device gamut in a perceptual space, as also being relative-position values of lightness and chroma within a corresponding hue page that is also part of the printer gamut in the same perceptual space, and using these relative-position values of lightness and chroma, within the printer gamut, to derive printer signals.

Here the "interpreting" substep may take the form of implicitly renaming variables. In other words this substep simply starts with values derived as having a first physical significance, and then uses those values on the understanding that they also have a second, different physical significance.

This central function will be demonstrated with full specificity in the detailed-description section of this document. The method also includes the step of then applying the printer signals, to control printing of the particular image portion by the printer.

In this description or definition, as elsewhere in this document, reference is made to a transformation that "has the effect of" performing the stated substeps. This language is used so as to encompass practice of the invention by either of two equivalent procedures.

One of these procedures is actual performance of all the stated substeps, concurrently with preparing to print the image portions or the entire image. The other equivalent procedure is a well-known software and firmware technique of instead referring to lookup tables.

This technique substitutes—for actual performance of all or some of the stated substeps—reference to one or more lookup tables. The entries in the lookup tables are preassembled by performing functions equivalent to the stated functions, or to subgroupings of those stated functions.

8. In preferred embodiments of this next primary facet of the invention, the invention is a method for printing a color image. The image is composed of plural image portions (whether formed as an array of pixels or otherwise).

The printing is performed with a color printer that has a known color gamut, and is based on initial color specifications for a display device that has a known color gamut. This method includes the step of receiving or developing, for a particular portion of the image, the initial color specifications expressed in terms of the display-device gamut in a color space related to operation of the display device.

This method also includes the step of performing on these specifications for the particular image portion a transformation that has the effect of performing these substeps:

based upon the selected specifications in terms of a hue page that is part of the display-device gamut and display-device color space, determining corresponding values of hue, lightness and chroma, expressed in terms of absolute position within a display-device hue page in a perceptual color space, finding hue-page characterizations for the display-device and printer hue pages (and particularly for the gamut boundaries of those pages), expressed in that same perceptual space, for the determined hue—also expressed in that perceptual space, using the found display-device (gamut) characterization, and also using the found absolute-position values of lightness and chroma exppressed in the perceptual space, to find corresponding first intermediate values of lightness and chroma, expressed in terms of relative position in the same perceptual space within the display-device gamut, employing the found printer (gamut) characterization, and also the first intermediate relative-position values of lightness and chroma, interpreted as also being relative-position values of lightness and chroma still in the same perceptual space within the printer gamut, to find second intermediate values of lightness and chroma expressed in terms of absolute position in that perceptual space within the printer gamut, and based upon the hue and the second intermediate relative-position values, all expressed in the same perceptual space, obtaining new color specifications expressed in terms of the printer gamut and a color space used for operation of the printer, for the particular image portion.

In addition the method of this aspect of the invention includes the further step of then applying the new color specifications, expressed in terms of the printer gamut and the printer space, to control printing of the particular image portion by the printer.

Merely as a shorthand summary or tutorial aid and not as a definition of the invention, the substeps and steps described above progress successively thus:

i. absolute values in input-device space translated into perceptual space, ii. absolute to normalized values, iii. input-device renamed to output-device values, iv. normalized to absolute values, v. perceptual-space to output-device space, and finally vi. driving the output device.

As can be seen, the "employing" substep mentioned above includes an "interpreting" function which is related to that in the main aspect of the invention discussed just before this one. The present method thus has the effect of a sequence of functions that includes—in the "using" substep—finding "relative position" perceptual values of hue and chroma. These are the "first intermediate" values.

Most typically, this function includes shifting and warping the "absolute position" perceptual values of lightness and chroma obtained in the earlier "determining" substep. Other ways of finding the relative-position values, however, may be substituted equivalently. (Commonly as an approximation, where the display-device-gamut intercept on the lightness axis is relatively small, shifting may be omitted.)

Then in the "employing" substep these first-intermediate values are subjected to an "interpreting" function that may be substantially a renaming function as explained above in connection with the just-previously-discussed aspect of the invention.

9. In preferred embodiments of a further primary facet of the invention, the invention is a set of lookup tables. The tables are for use in printing a color image based on input color specifications for a display device that has a color gamut which is at least partly known.

More specifically, the tables are for use in printing such an image with a color printer that has a color gamut, likewise at least partly known. The lookup table is prepared so that the tabulated values correspond to performing steps including:

interpreting relative-position values of lightness and chroma, within a display-device hue page that is part of the display-device gamut in a perceptual space, as also being relative-position values of lightness and chroma within a corresponding printer hue page within the printer gamut, in that same perceptual space;

employing these relative-position values within the printer hue page to derive printer signals; and then applying the printer signals to control printing by the printer.

The interpreting step is substantially as set forth above in regard to an earlier-discussed major facet of the invention.

10. In preferred embodiments of this next primary facet of the invention, the invention is a method for printing a color image composed of plural image portions. The meaning of "image portions" for this purpose is as set forth above in regard to an earlier-discussed facet of the invention.

The printing is performed with a color printer that has a known color gamut, and is based on color specifications for a display device that has a known color gamut. This method includes the steps of:

receiving or developing, for a particular image portion, display-device signals for controlling red, green and blue intensities for each image portion, in operation of the display device;

performing on the display-device signals a transformation that has the effect of performing these substeps:

determining values of hue, lightness and chroma, expressed in terms of absolute position within a display-device hue page that is part of the display-device gamut in a perceptual color space, that correspond to the signals, finding display-device- and printer-hue-page (gamut) characterizations, expressed in that same perceptual space, for the determined hue expressed in that perceptual space, using the found display-device-hue-page characterization to find first inter mediate values of lightness and chroma, expressed in terms of relative position in the same perceptual space within the display-device hue page, that correspond to the found absolute-position values of lightness and chroma expressed in that perceptual space, employing the found printer-hue-page characterization, and also employing the first intermediate relative-position values of lightness and chroma, interpreted as also being relative-position values of lightness and chroma in the same perceptual space within the printer hue page, to find second intermediate values of lightness and chroma expressed in terms of absolute position in that perceptual space within the printer hue page, based upon the hue and the second intermediate relative-position values, all expressed in the same perceptual space, obtaining printer signals for controlling quantities of cyan, magenta, yellow and black colorants for each image portion, in operation of the printer; and then applying the printer signals to control printing of the particular image portion by the printer.

The comments provided earlier to aid in understanding the previously discussed aspects of the invention are applicable to this aspect as well.

The foregoing may serve as descriptions or definitions of the primary facets or aspects of the present invention in broadest or most general terms. Even with each facet of the invention as above-presented in general or broad forms, however, as will shortly be seen each of these aspects of the invention makes important contribution to resolving the previously outlined problems of the related art.

All of the operational principles and advantages of the present invention will be fully appreciated upon consideration of the following detailed description, with reference to the appended drawings, of which:

BRIEF DESCRIPTION OF THE DRAWINGS

FIG. 2 is a similarly schematic and generalized view, but in plan with respect to the color space, and thus showing graphically superimposed—according to an embodiment related to that of FIG. 1—the normalized forms of two different two-dimensional color elements, namely constant-lightness planes, that correspond to certain normalized planes of constant lightness shown in perspective and identified in FIG. 1;

FIG. 7 is a diagram, analogous to FIG. 4 but using representative actual data, of unnormalized hue pages that are portions of both an input-device (CRT) gamut and output-device (printer) gamut;

DETAILED DESCRIPTION OF THE PREFERRED EMBODIMENTS

As noted earlier the parent patent document is fully incorporated into this document, by reference. Resort to that earlier document will be helpful as to uses of the hue-plus-gray (HPG), or hue/fraction-colorant/fraction-black (hnk), space as described in this document.

1. COLOR-SPACE-ELEMENT RENAMING/SUPERPOSITION TECHNIQUE

Figure 1:
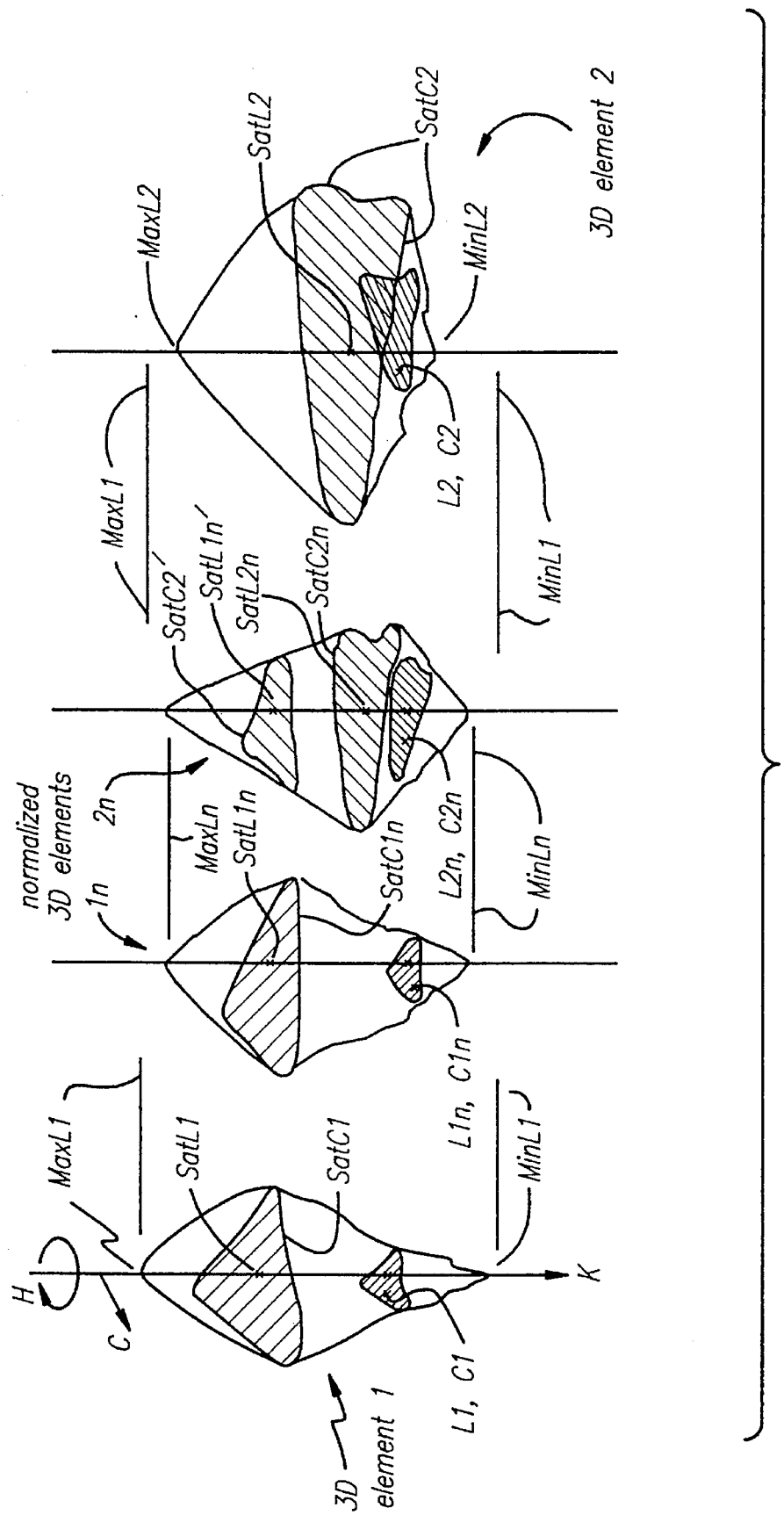
FIG. 1 is a highly schematic and generalized perspective view showing side-by-side two different three-dimensional color elements, and normalized forms of the same two three-dimensional color elements—for comparison and to facilitate visualization of a preferred embodiment of the invention, which embodiment includes superposition of the two color elements.

As indicated in FIG. 1, the most general form of these aspects of the invention encompasses color-space elements that are three dimensional. The drawing portrays two three-dimensional elements 1 and 2—placed at the left and right ends of the drawing, respectively—that may for example be gamuts.

For instance these elements may be gamuts of two color-presentation devices, such as a CRT and a printer respectively; or they may be gamuts of one color-presentation device expressed in terms of two different color spaces, as for instance one perceptual space and one device space, or two perceptual spaces, etc. The technique, however, is not limited to gamuts, or portions of gamuts; or even to use with characterizations of color-presentation devices.

Three-dimensional elements 1 and 2 are of very different shapes and sizes—element 1 being depicted as relatively tall and narrow, and element 2 as shallow and broad. In addition a maximum-saturation plane at height (position along the lightness/darkness or K axis) SatL1 in element 1 is relatively high, and an analogous plane at height SatL2 in element 2 is relatively low.

Further as indicated by the various horizontal hue-chroma planes (i.e. constant-lightness planes) that are drawn shaded within the two elements, the external contours of the two elements 1, 2 are very different. In particular both elements are fluted or sculpted vertically, but in opposite manners—element 1 being relatively broader toward the left (e.g., for blue and magenta), whereas element 2 is broad toward the right (e. g., for yellow and green).

For a degree of relative simplicity in FIG. 1 the maximum-saturation rims SatC1 and SatC2 for the two elements are shown as planar and generally horizontal. Additional variations (not shown) may and typically do include nonhorizontal and indeed nonplanar maximum-saturation rims, as is well known in this field. The invention encompasses such three-dimensional features, but the illustrated complexity suffices for present tutorial purposes.

In accordance with the present invention, new representations 1n, 2n (the center two bodies shown in FIG. 1) of the two elements are formed by normalization of the original bodies with respect to selected parameters. In this case the normalization has been with respect to overall height (lightness/darkness range) and maximum width (maximum saturated chroma).

When the two normalized elements 1n, 2n are now positioned with their respective minimum-lightness points at a common point MinLn along the K axis, as shown their maximum-lightness points will fall at another common point MaxLn along that same axis. The overall breadths of the hue-chroma planes of maximum saturation in the two inboard drawings now appear comparable; however, a perhaps-more-natural form of normalization is with respect to a particular hue point for which saturation is greatest, rather than with respect to the overall breadth.

The normalization may be visualized as assigning common scales—such as for example zero to one hundred—to the total range of each of specified parameters within each of the two elements. Thus for example the minimum normalized lightnesses MinLn for each element 1, 2 may be set to zero, and the maximum normalized lightnesses MaxLn for each element to one hundred.

Similarly the maximum chromas for some particular respective hues SatC1n(H1), SatC2n(H2) may also be set to one hundred. These hue values H1 and H2 (not identified in the drawing) are selected for having the saturation values that are the highest found for the entire three-dimensional elements 1 and 2 respectively.

For the arbitrarily selected case illustrated it can be seen that the normalized width is greater than the unnormalized width of element 1, but smaller than that of element 2. Conversely the normalized height is smaller than that of element 1 but greater than that of element 2.

Now despite the illustrated normalization, as the drawing clearly shows, the resulting maximum-saturation planes remain at very different normalized heights (K-axis positions) SatL1n and SatL2n. Also the normalization has not altered the mutually-opposed orientation, mentioned above, of the broader portions of the two elements.

These relatively unaltered relations are of particular interest. They correspond physically to fundamentally different color characteristics of two physical systems—corresponding to elements 1 and 2—that transcend simple normalization.

For example, such relationships may have to do with different color-presenting properties of two devices, or with differences between ways expressing the same color property of a single device in two different color spaces. These, however, are only examples; the invention is not limited to such applications.

In accordance with the invention these two normalized but different shapes are to be mapped together. In other words, some specified protocol is adopted for assignment of points in one normalized color-space element to positions in the other.

The protocol should be chosen or devised to preserve, in some physically meaningful way, relative positions of color points within the two elements. This can be accomplished even for generally very dissimilar shapes such as those illustrated, and for shapes that are even more dissimilar than these.

As will shortly be seen, such mapping may be particularly simple and easy when the two elements have more-similar shapes, and may be more appealing intuitively. Nevertheless the full power of the technique being described, for various applications, may be realized in some cases that involve greater degrees of dissimilarity such as illustrated.

In certain portions of this document the mapping-together of two normalized elements is described as superimposing or superposing the two normalized bodies 1, 2. Here the terms "superimposing" and "superposing" mean more than merely showing the two bodies aligned in the same space.

These terms as used in this document include also warping or distorting—stretching and compressing—one or both of the two bodies so that their boundaries are substantially or nearly congruent. As will be understood, this description is a geometrical conceptualization of, or geometrical way of describing, the technique rather than a physical action.

Similarly in certain parts of this document the mapping-together operation is described as renaming relative positions within one of the elements 1 and 2 so that they are also corresponding relative positions within the other. Still another description is of interpreting relative positions within one element as also being relative positions within the other.

These several ways of verbally expressing the mapping process are all equivalent, though as will be seen some may seem more natural and more easily susceptible of physical significance in some situations. Others may seem more natural and more easily given physical significance in other situations.

Now in practical use any given color point L1,C1 of particular interest within, say, the original unnormalized element 1 can first be expressed as a relative-position value L1n,C1n within the corresponding normalized element 1n. Next the mapping-together step permits any such relative-position value L1n,C1n —still corresponding to the given color point L1,C1 of particular interest—to be expressed as a relative-position value L2n,C2n within the other normalized element, element 2n.

Then the normalization is reversed to determine an actual position L2,C2 of a color point, corresponding to the initially given color L1,C1 of interest, within the unnormalized other element, element 2. By "reversed" here is meant undone, or unfolded, or expanded—to yield back the original shape and offsets of element 2.

The overall result is to map a given point L1,C1 of particular interest in color-space element 1 into a corresponding point L2,C2 in even an entirely dissimilar element 2. This mapping technique may be used for various purposes and will be seen as having similarly various associated physical meanings.

While FIG. 1 represents the element-superposition technique of the invention in three dimensions, the technique is amenable to practice with two-dimensional color-space elements. Typically these elements are parts of three-dimensional elements such as those 1, 2 of FIG. 1.

Such two-dimensional color elements may be surfaces, and most typically are regular surfaces. Such surfaces can be conceptualized as, for example, extracting particular constant-parameter relationships from three-dimensional parameter spaces such as shown in FIG. 1.

FIG. 2 illustrates use of the superposition technique with one such kind of surface: a hue-chroma plane, or plane of constant lightness. Two such elements are shown together in FIG. 2.

Both the planar elements in FIG. 2 have already been normalized, through a procedure like that illustrated in FIG. 1. One of these will be recognized as the normalized plane of maximum saturation SatC2n in FIG. 1.

The other planar element in FIG. 2, depending on the purpose at hand, may for example be selected as the normalized plane of maximum saturation SatC2n of FIG. 1. Alternatively some other plane may be selected, such as in particular the constant-lightness plane SatC2' (FIG. 1) which is at position L1n—i.e., the plane of the same lightness as the first-mentioned plane SatC1n.

Each of the two exemplary planes just identified can be of interest for different purposes, in connection with the element-superposition technique of the invention. In FIG. 2 the two two-dimensional elements are drawn together but not "superposed" in the sense of the invention: that is, they are not warped or distorted so that their boundaries substantially or nearly coincide.

In FIG. 2 it is clear that the two normalized elements overlap. They have a common generally central area which has been left unshaded in the drawing, and respectively protruding lobes—which have been shaded in two crossed orientations to help associate the protruding areas of each element.

If the two elements are respectively taken as representing, for example, portions of gamuts of two color-presenting devices, then the unshaded portion has the significance of colors available with both devices in common. The lobes shaded with lines ascending toward the left represent colors available only with device 1, and the lobes shaded with lines ascending toward the right represent colors available only with device 2.

Once again, even though the two elements SatC1n and SatC2n (or SatC2') have strongly diverging shapes, nevertheless some protocol or assignment rule can be devised to map each point in either element into a corresponding point in the other. Here too it is very desirable to select or develop such a rule or protocol that is useful in the sense of producing a mapping between the corresponding unnormalized elements (for instance SatC1 and SatC2, FIG. 1) that is satisfying or otherwise meaningful in terms of color relationships.

As those skilled in this field will appreciate, in general the meaningfulness of a produced mapping cannot be evaluated without knowing the application to which the results will be applied. Some exemplary applications will be discussed in later subsections of this section.

Figure 3:
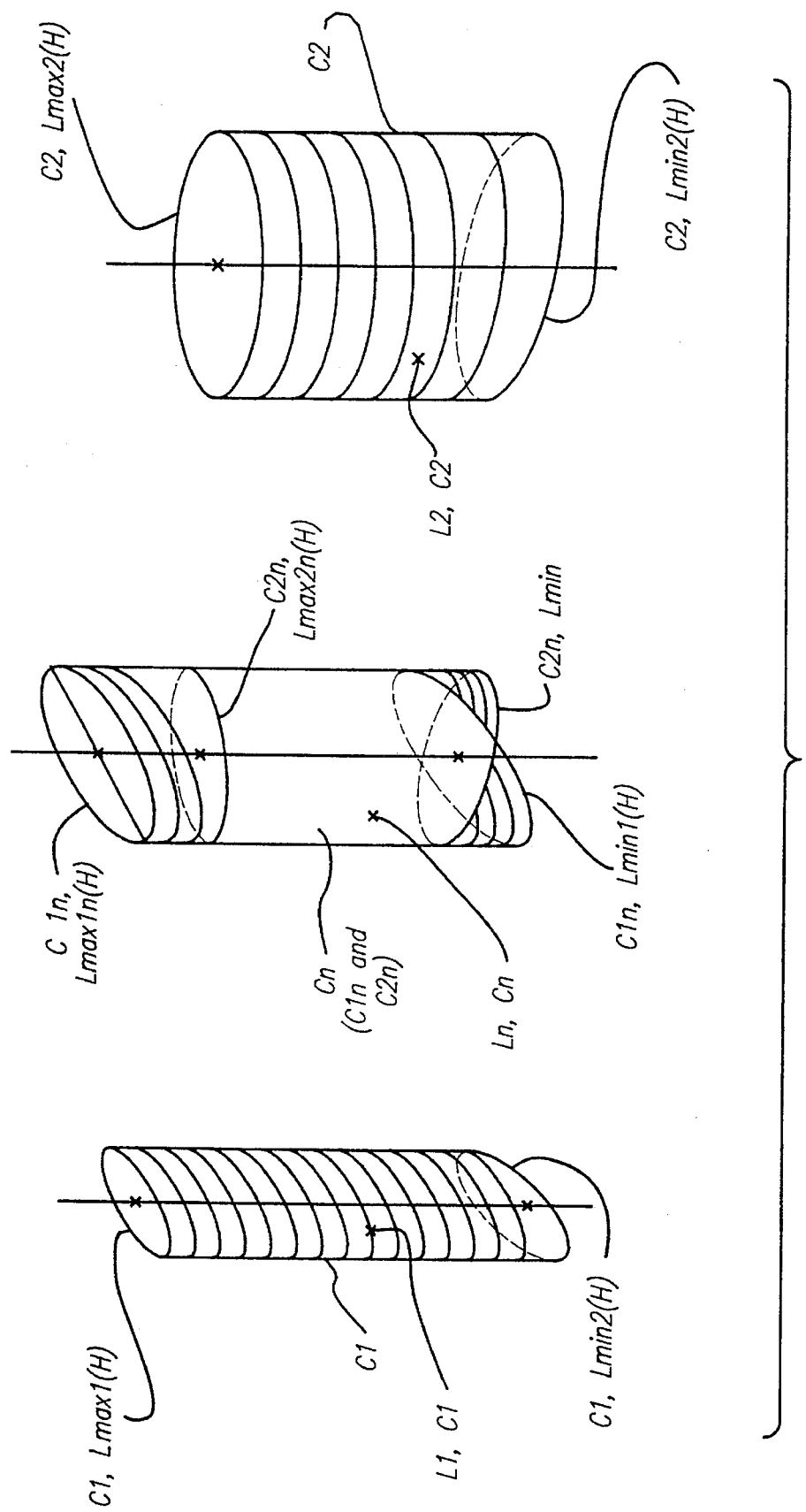
FIG. 3 is a view like FIG. 1 but showing side-by-side two different two-dimensional color elements, namely constant-chroma cylinders, that include certain color points identified in FIG. 1—and also showing the normalized forms of these two cylinders graphically superimposed according to yet another related embodiment.

FIG. 3 illustrates another kind of two-dimensional color element that is a part of three-dimensional elements such as the elements 1, 2 in FIG. 1. These elements, like those in FIG. 2, are regular surfaces in color space and in particular surfaces of constant parametric value.

Here the parameter held constant is chroma, and the polar color space yields constant-chroma surfaces C1, C2 in the form of cylinders. For purposes of discussion these surfaces may be taken as including specified internal points such as L1,C1 and L2,C2 of the three-dimensional elements in FIG. 1—even though as will be seen from the drawings the necessary relationships are not observed with regard to element 2.

As will be seen in correspondence with FIG. 1, the bottom (maximum-K, minimum-lightness) end of element 1 is steeply lower toward the left and higher toward the right. A like but less-steep relation obtains at the top end.

These relationships are seen clearly in unnormalized element C1 at the left end of FIG. 3—as is a converse relationship at the bottom end of element 2 in FIG. 1 and unnormalized element C2 at the right end of FIG. 3. To help track these patterns, the first element C1 in FIG. 3 is shaded with rightward-ascending lines, the second C2 with rightward-descending lines.

The central section of FIG. 3 shows the two elements together but only partially normalized. The width has been normalized, but for clarity the upper ends of the two elements—because their shapes are very similar—have not been represented as the same height.

In practice the normalization is completed by making the two normalized elements C1n and C2n the same height—with respect to some selected points of the upper and lower edges. Though illustrated together, the two normalized elements C1n and C2n again are not "superimposed" in the sense of the present invention.

Here as in FIG. 2 common parts of the two elements are unshaded, while the protruding portions of each element are shaded in correspondence with the patterns just described for C1 and C2 at left and right. Thus if these elements are interpreted as gamuts of respective devices, certain relatively dark tones are available at left (e.g., for blue and magenta) in normalized element C1 but not C2—and conversely at right (for yellow and green).

Now it will be understood that one or both of these normalized elements (after completion of the normalization as mentioned above) can be warped or deformed so that the oppositely angled boundaries lie substantially or very nearly along each other. With such a deformation every point in each normalized element C1n, C2n is implicitly mapped into a corresponding point of the other element.

Figure 4:
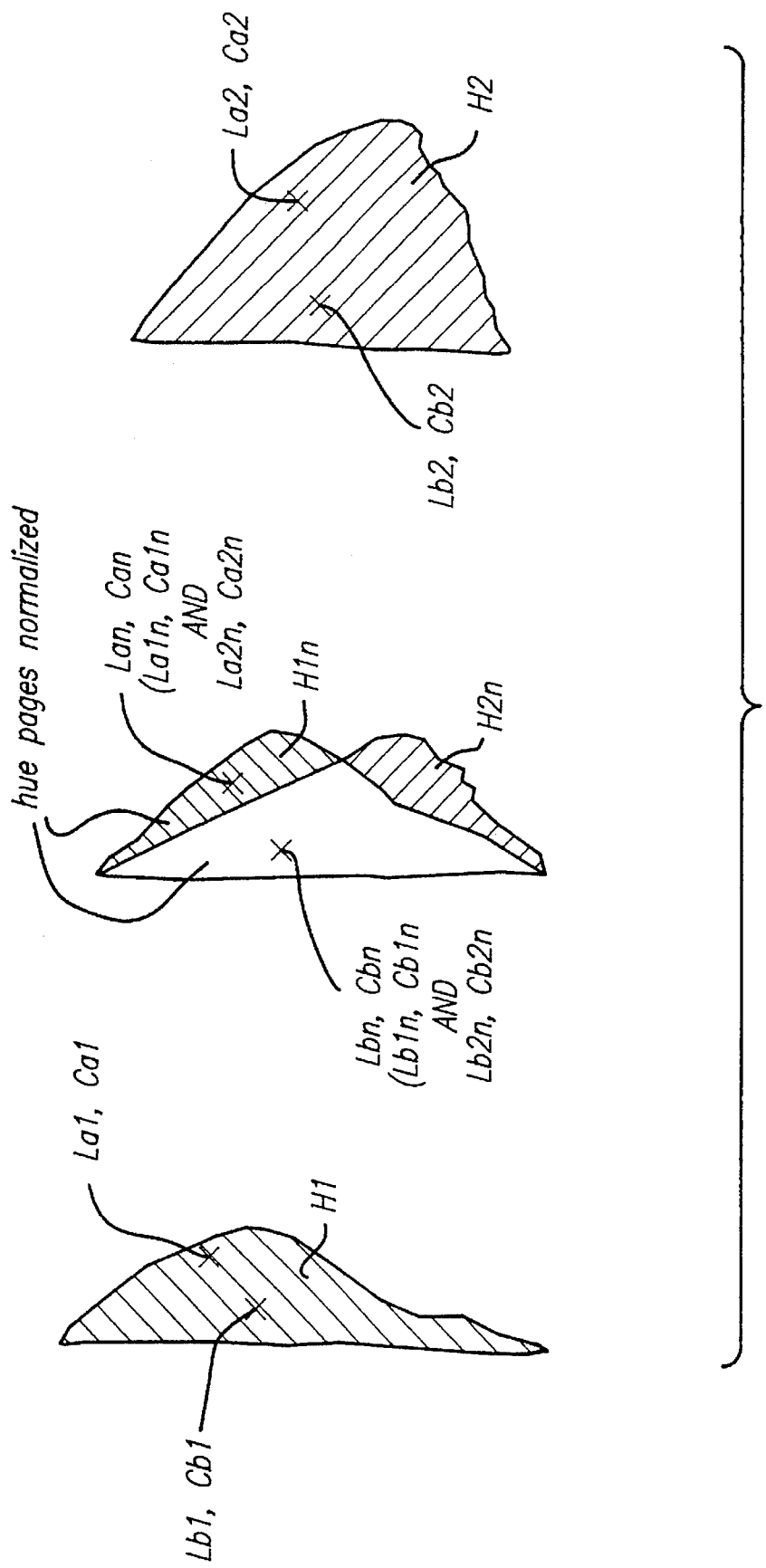
FIG. 4 is similarly schematic and generalized view, but in elevation with respect to the color space, and showing side-by-side two different two-dimensional color elements, namely hue planes or pages, that include color points analogous to certain points identified in FIG. 1—and also showing the normalized forms of these two pages graphically superimposed according to still another related embodiment.

FIG. 4 shows still another kind of two-dimensional color element that is a part of three-dimensional elements such as the elements 1, 2 in FIG. 1. These elements, like those in FIGS. 2 and 3, are regular surfaces in color space and in particular surfaces of constant parametric value.

Here the parameter held constant is hue, and the polar color space yields chroma-lightness surfaces (surfaces of constant hue) H1, H2 in the form of vertical planes each extending in just one direction from the central lightness axis. (In practice, depending upon the phenomenon that is being represented, such planes do not necessarily reach to the central axis for all lightnesses, or even any lightnesses.)

Such planes or so-called "hue pages" are illustrated at the two ends of FIG. 4 for—most typically, though not necessarily—a single common hue. Accordingly if the two unnormalized elements H1 and H2 are interpreted as gamuts of two devices, the two shapes represent attainable lightness-chroma pairs with the two devices respectively.

In the central section of FIG. 4 the two shapes—after normalization—are drawn aligned along the lightness axis, but not "superposed" within the special meaning employed in this document. As in FIGS. 1 and 2 the shading has been arranged to show which region is common and which regions are accessible, in the normalized regime, only with one or the other device.

It will now be recognized that one or both of the normalized hue pages H1n and H2n can be stretched and squeezed to bring the boundaries for the two pages into substantially or nearly complete mutual alignment. Every color point in the first normalized page H1n then finds its counterpart color point in the second normalized page H2n.

The drawing tracks mapping of two points distinguished as "a" and "b" through the FIG. 4 system. First the two given points, assumed to be of particular interest, are identified in the left-hand section of the drawing as La1,Ca1 and Lb1,Lb2 for the first unnormalized hue page H1.

These are mapped into the first normalized page H1n, where they are seen in like relative positions La1n,Ca1n and Lb1n,Cb1n. These points are then renamed, to reflect their significance as the counterpart points in the second normalized page H2n—or, in other words, their significance with respect to the second element H2—as La2$n$,Ca2$n$ and Lb2$n$, Cb2$n$.

FIG. 4 shows how the comparative locations of the two points persist relative to each other and to the element boundaries, through these first steps of the method. The drawing also shows how these comparative locations survive the next step, which as in the previous examples includes unfolding of the normalization to find the absolute values La2,Ca2 and Lb2,Cb2 in the second element H2.

Figure 5A:
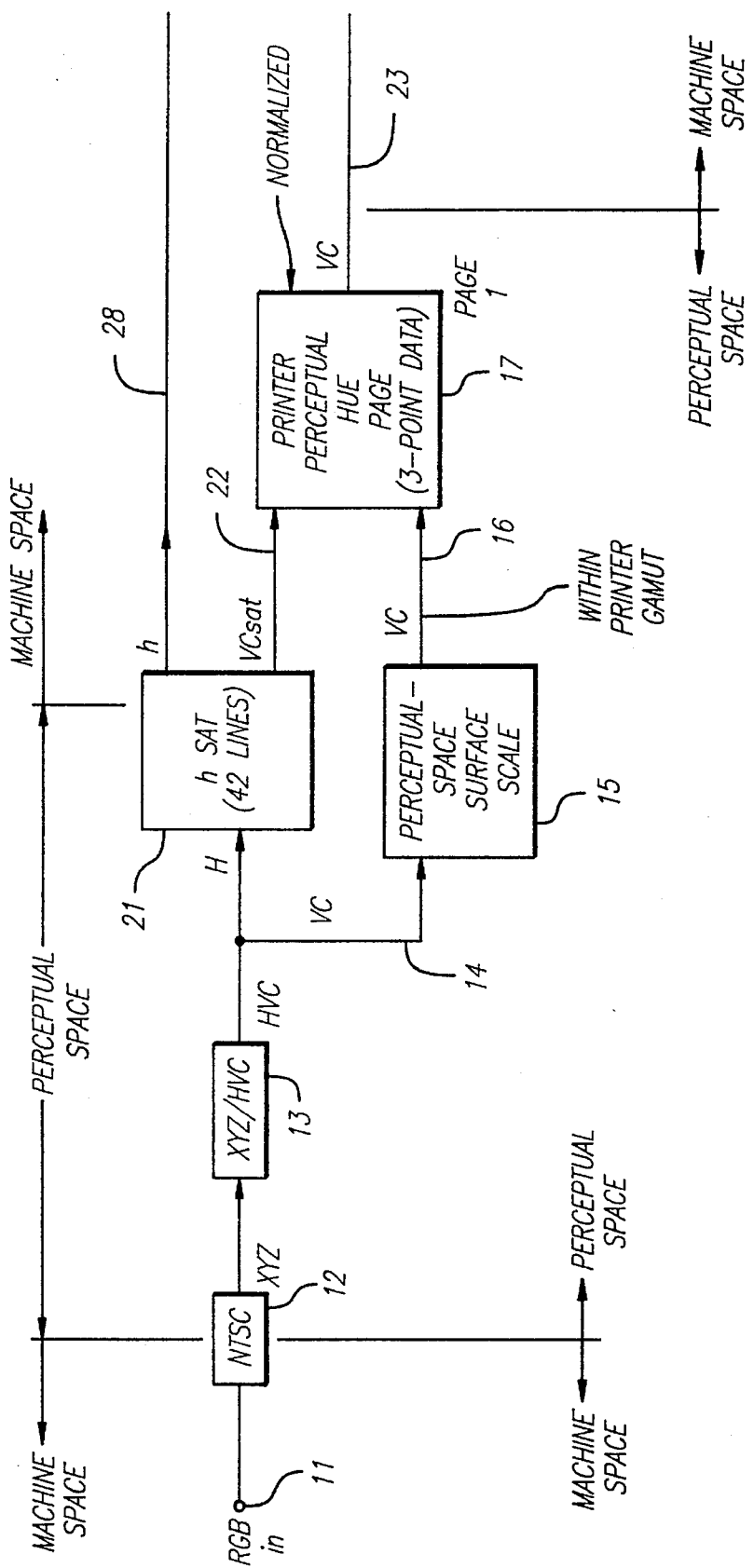
FIG. 5 is a schematic, conceptual block or flow diagram showing a preferred embodiment that is one way of using the superposition-technique embodiments of FIGS. 1 through 4 (but with fuller normalization)—in particular for the purpose of translating color specifications or signals from perceptual space into device space (a function which is sometimes called "color matching")
Figure 5B:
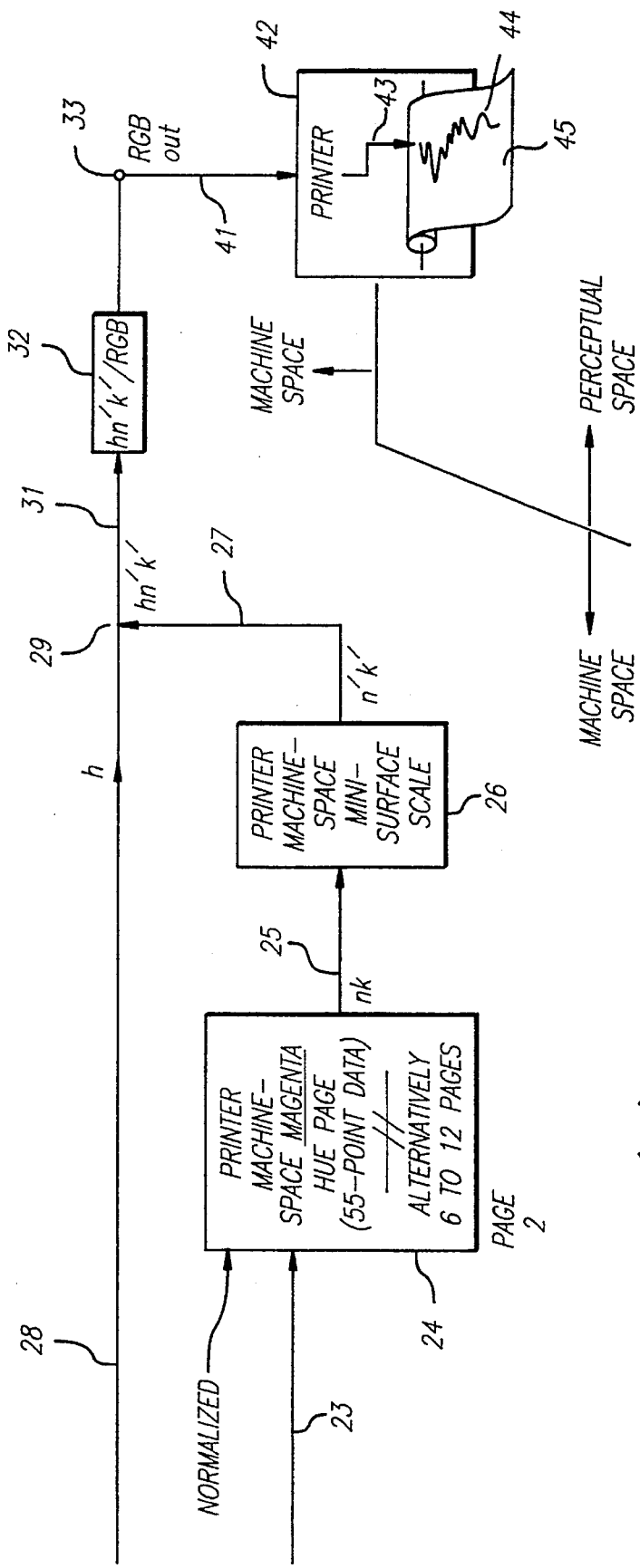

(a) Application in "color matching"—FIG. 5 shows how the technique of FIGS. 1 through 4, and in particular that of FIG. 4, can be used to perform a transformation or conversion from perceptual space into machine space. In the illustrated example, the technique translates perceptual color specifications into data values related to printer-control signals.

A conversion from perceptual data to machine-control signals is sometimes called a "color matching" process. Its objective is to cause the machine (e.g., printer) to actually present for human visual perception a color that substantially corresponds to the perceptual specification.

This nomenclature does not necessarily imply, however, that the visually presented color will accurately track some other color that has been physically presented (e.g., color seen on a CRT screen). This condition is met in some cases but not all.

In the FIG. 5 method, RGB color specifications for a desired image are input 11 to a conventional NTSC conversion step 12 which applies one well-known mathematical model to convert these data into a perceptual representation familiar to workers in this field and known as "XYZ". These values in turn are conventionally converted 13 into another well-known perceptual representation known as "HVC".

The desired-image hue H specified at this point is separated from the value V and chroma C values for divergent processing. This hue H is applied to the input of an "hSAT" lookup table 21 which is small—representatively it may have forty-two lines of values.

By interpolation between values in this table 21 a corresponding machine-space hue h is selected for the desired image. This number h is preferably in the hnk or HPG coordinates introduced in the above-mentioned parent patent document, here used as machine space The desired-image output hue h from the "hSAT" table 21 is ready for use, and as shown passes 28, 29, 31 directly to a conversion block 32 for translation to another machine-used space. That translation will be described shortly.

The "hSAT" table 21 also contains, for each of forty-two input perceptual hues H—in addition to the corresponding h data—both chroma Csat and value Vsat data for the maximum-saturation (maximum-chroma) point. These Csat and Vsat numbers too, in the table 21, are subjected to interpolation, and suitable numbers 22 read out to characterize the shape of a normalized hue page 17 at the corresponding perceptually defined desired-image hue H. This hue page 17 is part of the gamut of the printer 42 which is to be driven.

Meanwhile the given desired-image input value V and chroma C data from the two previously described input stages 12, 13 are separated from their accompanying hue H and applied 14 to a surface-scale module 15, which will be detailed in a later subsection of this document. The out-put 16 of this module 15 is corresponding desired-image value V and chroma C numbers that are within—or nearly within, as will be explained momentarily—the gamut of the printer 42.

These within-gamut value and chroma data are applied 16 to a block 17 that represents a normalized hue page of the printer 42 gamut. This is the same hue page which is characterized, as mentioned above, by the Csat and Vsat data interpolated from the "hSAT" table 21.

Thus the block 17 receives both desired-image data 16 for a given color point of interest and characterizing data 22 from that table 21. Within the block 17 accordingly a relative position of the desired-image color point V,C can be found—relative, that is, to the characterizing Vsat,CSat data, and thus to the shape of the hue page at the desired hue.

Determination of such a relative position is particularly straightforward and rapid since the hue page is represented by a very simple straight-line-bounded figure, and in fact preferably by a triangle. By virtue of the Vsat,Csat data selection specific to the particular perceptual hue H, however, the relative-position value thus determined reflects with surprising accuracy the relative coordinates of the desired-image input color within the normalized printer-gamut hue page 17.

This relative position, or relative normalized position, of the desired-image input color—in perceptual terms relative to the printer gamut—is read out 23 into another, quite different printer-gamut hue page representation 24. This second hue page 24, still characteristic of the same printer 42, is a machine-space page and is used to find machine control signals to implement the desired-color relative normalized position found in the first page.

To accomplish this that first-page 17 relative normalized position is simply treated as the relative normalized position within the second page 24. The normalization is then unfolded to yield actual machine-space data 25—namely fraction-colorant n (this is not the same as the "n" used to represent normalized variables elsewhere in this discussion) and fraction-black k.

This unfolding process entails rather simple arithmetic, considered to be within the ordinary skill of the art. The following subsection of this document, however, sets forth arithmetic operations for an analogous process.

As will now be clear, the two hue pages 17 and 24, also identified as "page 1" and "page 2" in FIG. 5, correspond in function to the pages H1 and H2 of FIG. 4. More generally they correspond functionally to the color elements 1 and 2 in FIG. 1, and the like-identified geometrical-surface color-space elements in FIGS. 2 and 3.

For purely practical reasons set forth in the above-mentioned parent patent document (and to be described shortly here), it is now preferred to translate the machine-space data nk into other machine-space parameters for passage to the printer 42. The data nk issuing 25 from the second hue page 24, however, with only slight fine-tuning 26 for minor gamut-boundary deviations, are quite capable of application to drive a suitably configured printer.

The second hue page 24 advantageously is developed on the basis of printer 42 performance at just one selected hue. This second hue page is represented by, preferably, about fifty-five data points that characterize the boundary and interior color-parameter variations of the hue page in terms of machine space—which is to say, printer control signals.

In terms of data and processing economies, it is particularly desirable to make use of a template page derived from printer color presentations at just a single representative hue. For this purpose it has been found especially effective to select a hue page for magenta.

Remarkably this fifty-five-point data model for a magenta hue page has been found to represent satisfactorily, for many purposes, the boundary position and internal variations for all hues. Successful operation of this system is not dependent upon selection of magenta, but that selection does confer some benefits.

In many pixel-based printing systems, and particularly so-called "CMYK" systems, magenta (the "M" in CMYK) is reproduced by a single ink dot per pixel and so is correspondingly less noisy than some others. The other single-dot colorants are somewhat less desirable.

Yellow ("Y"), for example is relatively very light in comparison with other colors, so that its maximum-saturation point is elevated to a nonrepresentative degree. Nonetheless colors other than magenta could be made to serve as the template for the other hues.

Although this single template produces serviceable results, nevertheless if desired small hue-dependent corrections can be applied later. Alternatively, if preferred, a small number of different hue pages may be used to model different hue ranges: the number of different pages may be, for instance, between six and twelve.

Each such page preferably has a comparable number (e.g., very roughly fifty-five) of data points. These hue pages need not be evenly spaced about the polar hue-angle dimension.

Rather they may advantageously be more finely spaced in sectors that are susceptible to more-sensitive variation of hue-page characterization with hue angle. In any event, since as suggested above one single page suffices for reasonably accurate color appearance, the accuracy attainable with a greater number (such as for example six to twelve pages) is quite striking.

The machine-space data nk produced 25 is next subjected to a minor or miniature form of surface scaling 26. This operation is considerably less comprehensive than the previously mentioned surface-scale module 15 (which is able to deal with large color-space areas of the input gamut that are outside the printer gamut).

Rather the "mini-" surface scale 26, which may also be regarded as a sort of clamping operation, deals with very-shallowly out-of-gamut points in certain specific areas along the printer gamut boundary. These areas arise from wandering of the normalized gamut boundaries shallowly in and out relative to one another.

Such cross-boundary wandering represents small imperfections in the gamut superposition, as between the two gamut approximations in the normalized hue pages 17, 24—i.e., "page 1" and "page 2". Next the output n'k' of the mini-scaling is directed 27, in effect, to a junction point 29 where these data rejoin the hue h information interpolated from the "hSAT" table 21 as described earlier.

The reconsolidated color specification hn'k' is directed 31 to a conversion stage 32 which expresses the hn'k' data in RGB terms for output 33 from the computer and application 41 to operate a printer 42. Typically the printer operates using CMYK colorants, to produce all colors within its gamut—including RGB—by a familiar subtractive color process.

Accordingly it would be more direct to pass the hn'k' signals directly to the printer, for conversion there to CMYK signals; or alternatively to convert the hn'k' signals to CMYK and then pass them in that form to the printer. Either of these operating modes is within the scope of the invention.

For purely historical reasons (related to the previously discussed pipe-through systems), however, a current standard practice is to drive printers with RGB signals. This traditional arrangement leaves to the printer a final, historically established conversion needed for CMYK signal generation.

As indicated above, the FIG. 5 system is remarkably "accurate". Those skilled in the art will understand that this refers to accuracy in an internal or relative sense, in relation to colors that would be obtained if more-complete information were used throughout the color space as is done conventionally.

This is not to say that any such system can produce entirely accurate colors as between, for instance, the printed and CRT-displayed versions of an image. A fundamental limitation on accuracy is posed first by the different device gamuts.

For example, as explained earlier, surface scaling such as that 15 provided in FIG. 5 produces printed colors that are related, by various selected tradeoffs—but not in general identical—to those displayed by a CRT. A like statement applies to, for example, gamut compression.

In addition, information processed by the FIG. 5 system is only related theoretically—by the NTSC mathematical model 12—to what may be truly seen on, for example, a CRT screen that receives the same or related RGB data as applied 11 to the system input.

Since a particular CRT screen in use may not conform well to that standard model, the perceptual-space parts of the system can be operating based, in effect, upon inaccurate assumptions; and so of course will produce printed color 44 not related in the expected way to what appears on the screen. No attempt is made in the FIG. 5 system to deal with this source of error.

Insights into the workings of the illustrated system may be gained by noting which parts of FIG. 5 operate in perceptual space and which in machine space. Some markings on the diagram indicate the two domains.

From FIG. 5 it can be noted that the printer pen 43 produces a color image 44 on a piece of printing medium 45. This image 44 consists of colors thus presented by the printer 42 for viewing—i.e., visual perception—by the human user of the system.

Accordingly the color image 44 on the medium 45 is by definition within perceptual space. With respect to the lower, VC-to-n'k' data path in FIG. 5, the machine-space parts of the system encompass the series of blocks that begins with the second hue page 24 ("page 2") and continues through the output printer-control signals 41.

With respect to the upper, M-to-h data path, the machine-space part of the system encompasses the output half of the "hSAT" table 21, and again continuing through the printer signals 41. The input RGB signal 11, and input end of the NTSC block 12, also are in machine space. Thus, perceptual-space parts of the system begin with the output of the NTSC conversion 12 and end where the machine-space portions begin.

In summary, the application of color-element superposition for color matching as in FIG. 5 is notable for obtaining good relative accuracy through use of only an extremely small amount of data, and rather modest processing. Part of this data economy is derived from the superposition technique, and part from the representation of color-element shapes by simplified geometrical approximations as mentioned earlier.

In this case, the geometrical forms used are triangles. Each of two hue pages is represented by one triangle, respectively: one hue page is part of the gamut of a particular printer in perceptual space, and the other hue page is part of the gamut of the same printer in machine space, or in other words printer-control signals.

The first triangle is represented by essentially only the coordinates of the three vertices. The second is represented by, preferably, a number of points between perhaps roughly twenty-five and one hundred, that characterize the boundary and the interior color-parameter variations.

(b) Application in gamut matching—This application is represented first in block-diagram form, partly parallelling that of FIG. 5. The printers 42, 142 in the two drawings are mutually equivalent, and the rest of the FIG. 5 system is comparable or analogous in function to the driver 110 in FIG. 6.

Figure 6B:
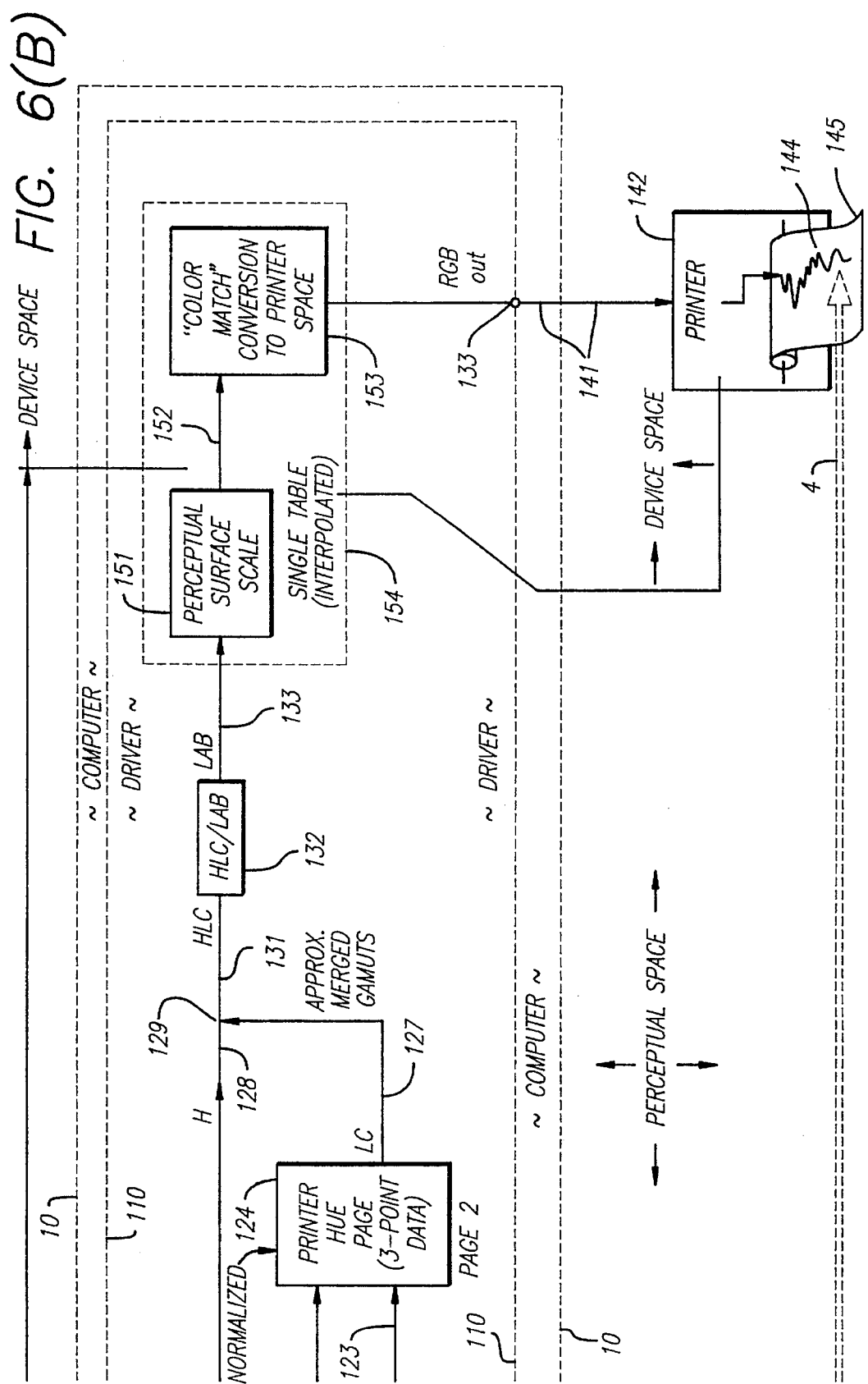
FIG. 6 is a like diagram showing another preferred embodiment that is a second way of using the FIG. 1 through 4 embodiments (also with more-complete normalization)—in particular for the purpose of aligning inputdevice and output-device gamuts (a function which in this document will sometimes be called "gamut matching")

FIG. 6 also illustrates that the driver operates within a computer 10, and illustrates as well the human operator 1 whose vision 1' provides the basic common perception 2, 4 of CRT display 3 and printed image 144. As indicated, the operator may use the computer controls 5 to enter image specifications 6 into an applications program 7, also operating within the computer 10.

The program responds by directing the RGB signal 11 into the driver 10—just as in FIG. 5—and also a version R"G"B" of the same signal to drive the CRT 3. Within the driver are shown initial SMPTE and simplified XYZ-to-HLC blocks 112, 113 that perform conversions directly analogous to those of equivalently positioned blocks 12, 13 in FIG. 5. (What is actually used at simplified block 113 is a two-stage XYZ-to-LAB-to-HLC conversion.)

These blocks 112, 113 in FIG. 6 simply use different standard mathematical models and color spaces to obtain perceptual operating color specifications. They come out in another well-known system of color coordinates, HLC.

(In a preferred embodiment that is very closely related to the FIG. 5 system, the illustrated SMPTE and XYZ/HLC blocks 112, 113 are respectively replaced by a different mathematical model—which like the SMPTE model produces an XYZ output. The substitute model is a popular one promulgated by the Sony Corporation for its Trinitron® monitors.)

As in FIG. 5 the hue H information is split off for separate handling. Here, however, before being further modified the hue H information is simply held 128 for later recombination 129 with modified lightness L and chroma C information.

In the lower path 114 of the drawing, the hue H is applied to an "HSAT" table 121—analogous to the "hSAT" table 21 in FIG. 5. The output 122 of this "HSAT" table is saturated lightness Lsat and chroma Csat characterizing data, interpolated between the nearest two of a number (preferably about forty-two, as in FIG. 5) of hue points.

These characterizing data 122, and the original lightness L and chroma C input data, are both applied to a normalized three-point triangular hue-page approximation 117. Together these data establish relative position 123 of the desired lightness-chroma LC point within the CRT hue page 117 ("page 1" in FIG. 6).

This relative-position specification 123 is applied to a second hue page 124, "page 2" in FIG. 6. To this point, as will be recognized, operation of the FIG. 6 system is rather closely analogous to that discussed above for FIG. 5.

In FIG. 6, however, the "page 1" hue page 117 is not a gamut-representing page for the printer but rather for the CRT. Furthermore the "page 2" hue page 124 is not a fifty-five-point page in device space but rather another three-point page in perceptual space.

By arithmetic manipulation-set forth below, the system then unfolds the "page 2" normalization. In this step the system uses the relative LC position 123 in the CRT hue page on the understanding that it is also relative LC position within the normalized printer hue page 124—to find the corresponding actual or absolute LC position 127 in the Unnormalized printer page.

To enable this unfolding, lightness LSat and chroma Csat characterizing data are also applied 122 from the same above-mentioned HSAT table 121 to the printer hue page 124 as illustrated. These characterizing Lsat and Csat data directed to the printer page 124, however, are different numbers from those applied to the first page 117. The numbers applied to the second page define the hue-page characterizations for the printer, not the CRT.

The physical significance of the resulting new LC data 127, output from the "page 2" block 124, is thus entirely different from that of the output nk data 25 in FIG. 5. The LC data 127 here represent the perceptual position within the printer gamut that corresponds—in a manner to be explained shortly—to perceptual position of the specified input color within the CRT gamut.

The signal 127 identifies the absolute position within the printer gamut that has the same relationship to the rest of the printer gamut as the desired image color has to the rest of the CRT gamut. What has been accomplished is a mapping or matching of the CRT gamut to the printer gamut, which preserves to the maximum possible extent relative positions and thus information content (capability to discriminate related colors).

This does not mean that the colors to be printed will appear to be the same, and in fact they will not; furthermore no "color matching" step akin to that step 17-23-24 in FIG. 5 has been performed. Instead these benefits accrue:

(1) color relationships are preserved, and (2) the full gamut of the printer can be used.

Protruding lobes of the printer gamut—conventionally discarded, as mentioned earlier—are here fully employed. No area of the CRT gamut must be mapped into a line of the printer gamut.

The color specification 127, however, while thus "gamut matched" has not yet been "color matched" in the sense previously explained with regard to FIG. 5. Furthermore it has not yet been trimmed up to account for the mutual small wanderings of gamut boundary mentioned earlier.

In preparation for these steps, the LC data 127, recombined 129 with hue H data 128 as mentioned earlier, are converted 132 into another well-known perceptual parameter set LAB, somewhat more convenient for the next step. Thus expressed, the data are applied 133 to a single table 154 that encompasses two processes.

The first of these is a perceptual surface scaling 151 used to take care of the shallow gamut-boundary errors described previously. Here, however, because the two-step table 154 happens to be available from other systems, it is more convenient to use a form of surface scaling that is capable of handling the entire CRT gamut.

As will be understood, due to the operation of the gamut-matching blocks 117-123-124 the system never calls upon this table 154 to do so. In FIG. 6 the first process 151 encompassed within the table 154 never handles more than a shallow out-of-gamut condition very near the gamut boundary.

The second process 153 within the table 154 is a color-matching process—in the previously established sense of conversion between machine and perceptual parameters, but here going from perceptual to machine. Unlike the color-matching step in FIG. 5, however, here the process 153 proceeds conventionally, i.e. based on relatively large data assemblages. This process 153, though performed in an entirely different way, serves the same purpose as the FIG. 5 superposition stage 17-23-24.

In fact if preferred a hybrid system could be constructed using the FIG. 6 superposition stage 117-123-124 for gamut matching in series with the FIG. 5 superposition stage 17-23-24 for color matching. The mini-scaling 26 of FIG. 5 would also be appropriate.

Such a hybrid system would produce results conceptually parallel to those of FIG. 6, though perhaps less accurate, but with far less data storage—due to elimination of the table 154. Moreover, since that large table 154 requires relatively costly interpolation in three dimensions, the added processing steps for the superposition stages would not represent a net processing penalty.

The superposition processes used in FIGS. 5 and 6 are examples of a system known as "hue-controlled machine space"—and by the acronym "HMS". What they have in common, as can now be seen, is the capability to interrelate different color-space phenomena very fully but economically.

Other aspects of the HMS system are introduced in a later subsection of this detailed description. Before leaving the present topic, however, some further historical background and operating details of the FIG. 6 system are presented here.

In the remainder of this subsection, the phrase "color matching" is used with a different meaning than in earlier parts of document—where it was used as a synonym for conversion between perceptual and machine specifications. Here it means, in essence, producing printed colors that appear as much as possible like corresponding CRT-displayed colors.

With the introduction of screen-to-printer color-matching drivers, users have been offered the option of turning color matching on or off for printing overhead transparencies. With color matching turned off, overhead transparencies had an appropriate amount of saturation or vividness, but the hues did not often match well from screen to transparency.

When color matching was turned on, colors matched well, but overall the colors were not printed with the full vividness of which the printer was capable. The HMS system provides a new approach to optimally serve the user's needs for transparencies. This approach:

maximizes the use of the printer gamut—make effective use of the available range of printer colors;

maps the most-saturated colors from the CRT gamut to corresponding most-saturated colors in the printer gamut;

matches the hue of the overhead-transparency color to that of the CRT color;

ensures that visual change in colors on the screen yields a meaningful visual change in the corresponding printed colors; and avoids artifacts of gamut scaling associated with an appearance matching approach.

Such artifacts include mapping similar CRT colors to a single, identical printer color. These artifacts also include desaturation that can occur when the shapes of the two gamuts are mismatched.

As applied here, HMS seeks to maintain hue matching from a source-device color space to a destination-device color space. It performs perceptual chroma and lightness scaling from source to destination gamut, and transforms the shape of the source gamut to the destination gamut.

In addition, this method seeks to:

improve hue matching from the CRT to printer;

improve the robustness of the processing in dealing with shading from black to fully saturated colors; and decrease sensitivity to changes in the CRT characterization.

This method performs all of its transformations in uniform perceptual color spaces (such as CIELAB and CIE-HLC, as indicated in FIG. 6).

FIG. 7 illustrates a representation of a portion of both a printer and CRT color gamut. The x axis represents C*, the y axis represents L*.

All of the plotted points have similar or identical H* values (a single hue page of each device is being represented). The printer hue page exhibited here is derived from a device HNK hue page whose most saturated color is device green on a printer produced by the Hewlett Packard Company under the model designation PaintJet® XL300, using glossy media.

As illustrated, measured white for glossy media attains an L* value of about 95. As colors are plotted from printer white to green, the lightness decreases to about 50, while the chroma increases to about 60. In shading from full printer green to black, an irregular path is followed to a black with an L* of about 8.

For a CRT hue page of the same M, as this green, the behavior is much different. Chroma increases to about 50 at full CRT green of this H*, but lightness remains high at an L* of about 90.

In this example, the shape of each gamut for this hue is similar, except that the most saturated point for each varies considerably in lightness: this difference causes a significant amount of nonoverlap. For typical printers the shapes of the gamut surfaces are usually similar for each H*, but often the most saturated point in one gamut is either lighter/darker or more/less vivid than the corresponding saturated point in the other gamut.

This method implements a mapping of the ranges and relationships of colors from the CRT gamut to the printer gamut. One can visualize each gamut as a volume of space bounded by a three-dimensional surface as in FIG. 1.

This method manipulates the colors in the CRT gamut (e.g., element 1 in FIG. 1) so that they conform to the volume and surface of the printer gamut (element 2 in FIG. 1). As will be recalled, the color-space elements 1 and 2 of FIG. 1 do not necessarily represent gamuts, but they can— and in that usage are helpful for the present discussion.

CRT white/black are mapped to the corresponding points for the printer gamut. The most-saturated CRT color is mapped to the most-saturated printer color at same H*. Gamut scaling/clipping is avoided by transforming all colors on the hue page, in such a fashion that the out-of-gamut colors are within gamut.

Now instead of visualizing the gamut as a complex three-dimensional surface, it is useful to instead visualize each gamut as broken into, or in any event selectively represented by, a series of hue pages. Each hue page represents the range of chroma and lightness attainable on that device for that hue H*. Considering a single hue page at a time, this method implements the effect of transforming each hue page of the CRT to the shape of the corresponding printer hue page.

Figure 8:
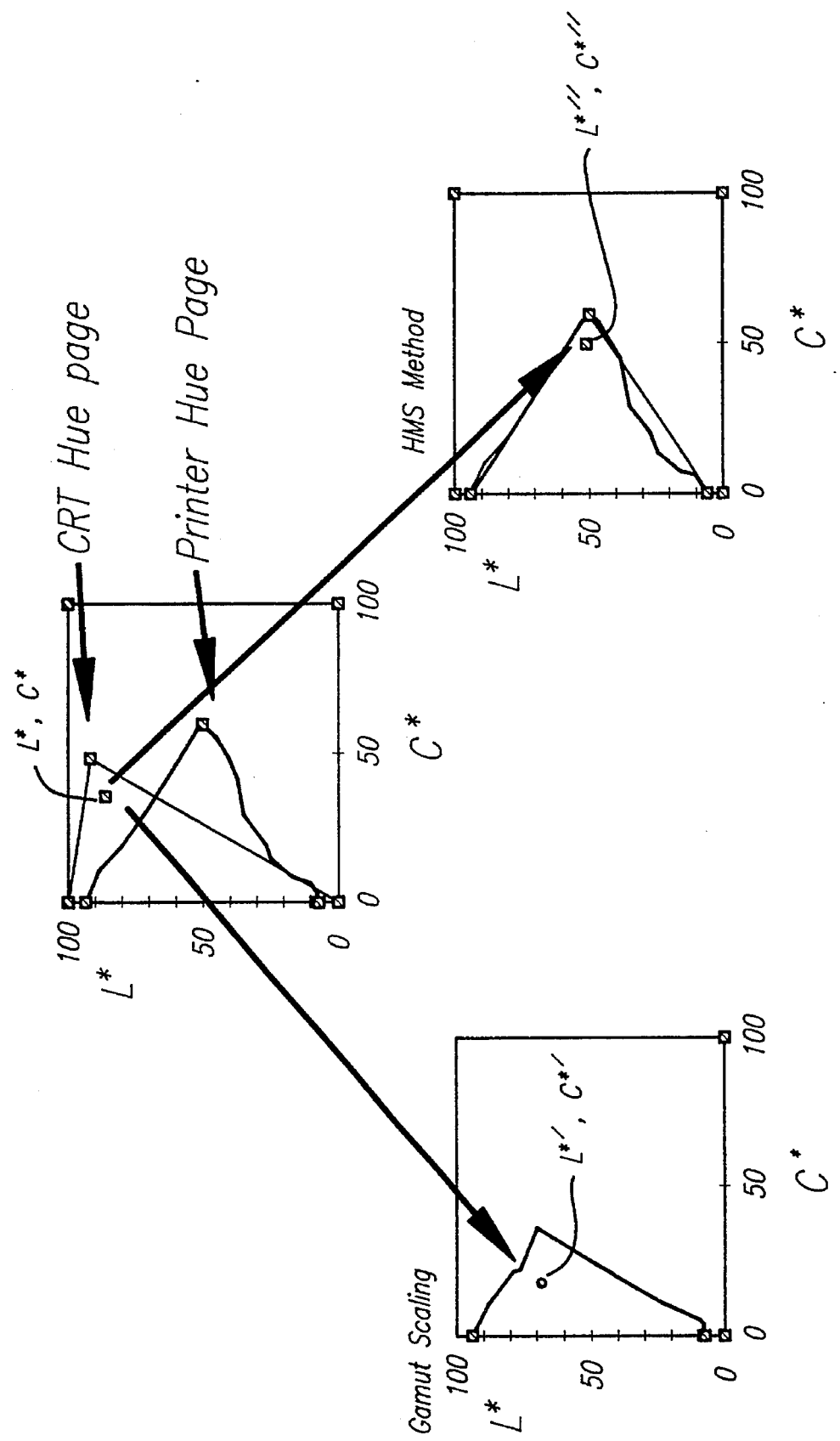
FIG. 8 is a set of three like diagrams related to FIG. 7 but comparing two different techniques of interrelating the FIG. 7 hue pages—one by gamut compression, and one by the FIG. 6 embodiment using full normalization.

FIG. 8 represents this for a single hue page. Also shown at bottom left in FIG. 8 is the effect obtained with a gamut-scaling approach of the gamut-compression type: colors in the CRT gamut lying above the printer gamut are mapped to locations within the printer gamut. Colors in the printer gamut that are outside the CRT gamut are unreachable, since there is no mechanism for specifying them in CRT RGB.

Figure 9:
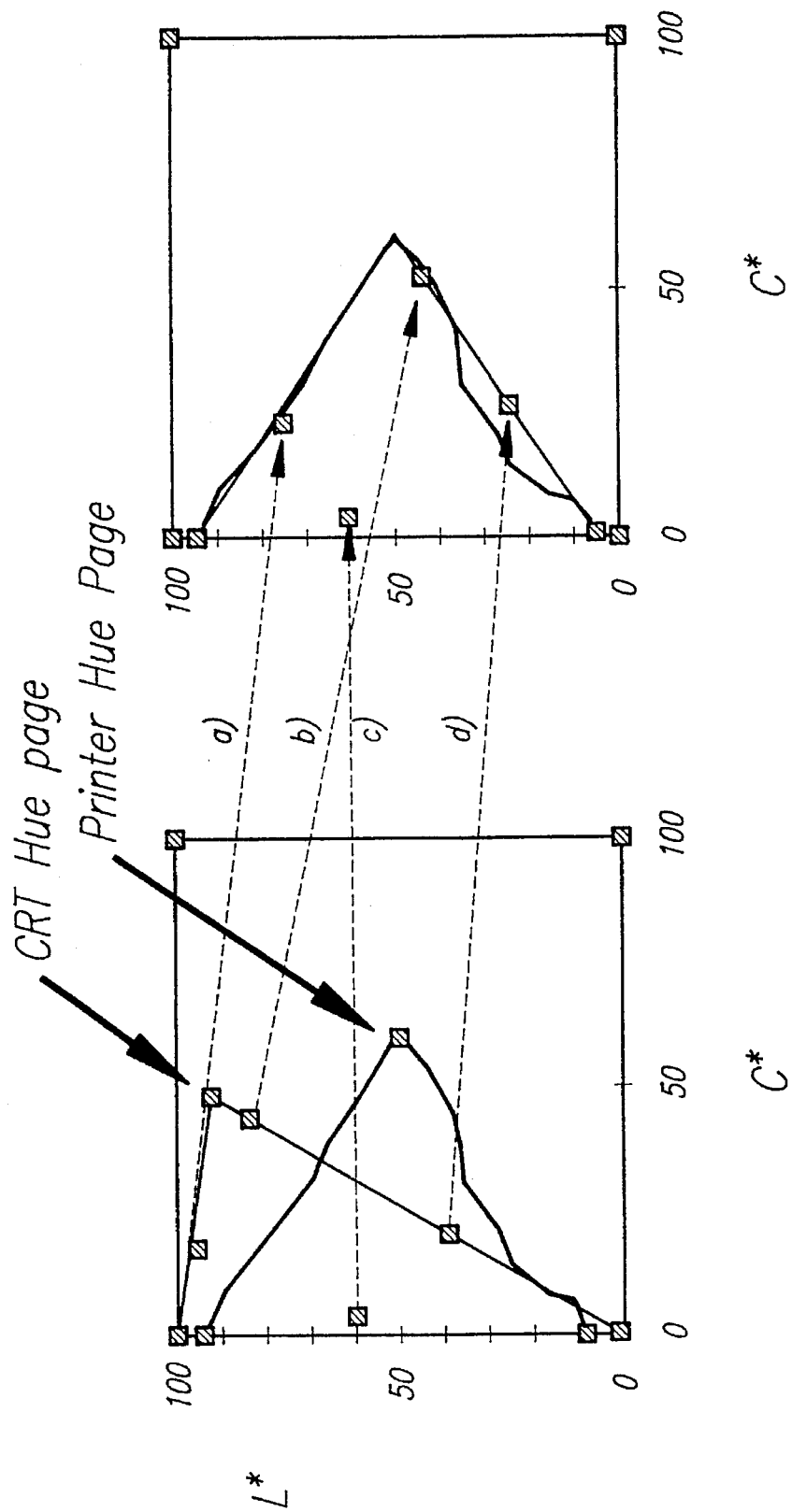
FIG. 9 is a set of two like diagrams showing the full normalization and mapping of four colors using the FIG. 6 embodiment.

FIG. 9 shows an example mapping of four colors. Color a) in CRT space is one-third of the way between white and fully saturated—and in its mapping to the printer gamut is placed one-third of the way between printer white and fully saturated, at the gamut surface.

Color b) is analogous, and analogously transformed, but part way from fully saturated CRT color to black. Color c)

is transformed very little, since it is fairly neutral, and in the middle of the lightness range of the CRT.

Color d) is about two-thirds of the way from CRT fully saturated to black. This same relative position is maintained with respect to the simplified printer gamut. Note that this point is slightly outside the unsimplified gamut, due to the triangular approximation of the hue page in the simplified version. The gamut scaling 151 (FIG. 6) incorporated in the CIELAB-to-printer RGB processing 154 scales this to the printer gamut surface.

In this method, four key pieces of information are very important. The first two are the characterization tables 112, 153 for the CRT and printer, which allow conversion from CRT RGB to CIELAB, and from CIELAB to printer RGB.

The second two tables are approximations to the shape of the CRT and printer gamuts. The shape of each gamut is approximated with a table describing the black point, white point, and $L^*,C^*$ pairs for saturated colors of known $H^*$ values.

For both the CRT and printer, as previously explained this information is held in the Hsat table 121. This information enables derivation of a triangular representation for each hue page that approximates the actual gamut shape at that $H^*$.

This method advantageously may use three hundred sixty discrete hue pages, sampled at approximately one-degree $H^*$ increments for each gamut; if preferred a smaller sampling such as forty-two pages may be used instead—with tradeoffs as between data storage and relative color accuracy that will now be evident to those skilled in the art. In the forty-two-page case, interpolation is desirable, but (as may be understood from the earlier discussion of applying a magenta hue page as a hue-page template throughout the color circle) not strictly necessary.

In mapping of a CRT color, first its $H^*$ hue is determined. Based upon this information used as a key to the HSAT table 121, the descriptions of the corresponding CRT and printer hue page are retrieved.

The relative position of the source color is found within the CRT hue page—simultaneously establishing the corresponding relative position within the printer hue page. This new relative position is then used to find new $L^*,C^*$ coordinates for the color. When combined with the source color $H^*$, they form a new color.

This operation can be regarded as transforming the color from one triangular hue page to the other. Based on the white and black points of the CRT and printer, and the $L^*,C^*$ of the most-saturated color for each hue page, a mathematical transform is derived which maps any point within that CRT hue page to the printer hue page.

Here is a step-by-step explanation of the process which transforms colors from the CRT gamut to the printer gamut. The variables are:

CrtL,CrtC the L$L^*,C^*$ value of the CRT RGB value as predicted by the CRT-RGB-to-CIELAB transformation;
CrtSatL,CrtSatC the $L^*,C^*$ values of CRT hue page corresponding to the original hue of the CRT color;
CrtMaxL,CrtMinL by convention 100 and 0;
PrSatL,PrSatC the $L^*,C^*$ values of printer hue page corresponding to the original hue of the CRT color;
PrMaxL,PrMinL maximum and minimum printer $L^*$ values, which are media and printer specific;
CrtCn,CrtLn a normalized version of the original $C^*,L^*$ of the CRT color;
PrSatLn a normalized version of the $L^*$ value of the most saturated printer color on the current hue page;
PrLn a normalized version of the new $L^*$ value being computed; and
PrL,PrC the new $L^*,C^*$ value of the color, as transformed from the CRT gamut to the printer gamut.

The computational steps are as follows.

1) Use equation 1 to compute the relative amount of lightness of the most saturated CRT color for this $H^*$ hue (Range of 0.0 to 1.0). Normally CrtMaxL is equal to 100, and CrtMinL equal to 0 by convention.

2) Use equation 2 to compute the relative amount of chroma of the CRT color vs. the most saturated CRT color for this $H^*$ hue (Range of 0.0 to 1.0).

3) Use equation 3 to compute the relative amount of lightness of the CRT color being transformed.

4) Use equation 4 to compute the relative amount of lightness of the most saturated printer color for this $H^*$ hue (Range of 0.0 to 1.0). PrMaxL is media specific, and is the $L^*$ value of white paper, or transparency media backed by white paper. PrMinL is media and ink specific, and is the $L^*$ value of full printer black.

$$\underline{CrtSatLn} = \frac{(CrtSatL - CrtMinL)}{(CrtMaxL - CrtMinL)} \quad (eq.\ 1)$$

$$\underline{CrtCn} = \frac{CrtC}{CrtSatC} \quad (eq.\ 2)$$

$$\underline{CrtLn} = \frac{(CrtL - CrtMinL)}{(CrtMaxL - CrtMinL)} \quad (eq.\ 3)$$

$$\underline{PrSatLn} = \frac{(PrSatL - PrMinL)}{(PrMaxL - PrMinL)} \quad (eq.\ 4)$$

$$\underline{PrLn} = \underline{CrtLn} + \underline{CrtCn} \times (\underline{PrSatLn} - \underline{CrtSatLn}) \quad (eq.\ 5)$$

$$\underline{PrL} = \underline{PrLn} \times (\underline{PrMaxL} - \underline{PrMinL}) + \underline{PrMinL} \quad (eq.\ 6)$$

$$\underline{PrC} = \underline{CrtCn} \times \underline{PrSatC} \quad (eq.\ 7)$$

5) Use equation 5 to compute the relative amount of lightness of the new transformed color.

6) Use equation 6 to compute the $L^*$ value of the new transformed color.

7) Use equation 7 to compute the $C^*$ value of the new transformed color.

To perform the color processing by this method:

1) derive gamut shape information from the CRT characterization table;

2) preprocess CIEHLC samples from forty-two saturated printer colors;

3) preprocess the gamut shape information for each gamut to derive a three-hundred-sixty-entry lookup table mapping $H^*$ to $L^*,C^*$ of the most-saturated point for that $H^*$;

(Note that this is a more highly preferred arrangement, relative to the earlier-mentioned alternative of interpolation in real processing time between adjacent entries in the forty-two-hue tabulation. The resulting lookup tabulation may be symbolized as: "Crt_HvsLC[360][2] and printer_HvsLC[360][2]".)

4) for each color that will be processed, map the CRT RGB value through the CRT RGB to CIELAB table, then convert to CIEHLC (Horg, Lorg, Corg);

5) look up the CRT and printer hue page description for a hue angle of Horg;

6) transform Lorg and Corg from the CRT gamut to the printer gamut based on the shape of the corresponding CRT and printer hue page;

7) convert Horg, Lnew, Cnew to CIELAB; and 8) map this CIELAB value through the CIELAB to printer RGB table, yielding the final printer RGB value.

2. RADIAL OR PIVOT-POINT SURFACE SCALING

The presentation of HMS techniques will now be left briefly to discuss an embodiment of the invention which provides a preferred form of surface scaling—for use in, for example, the major surface-scaling modules 15 (FIG. 5) and 151 (FIG. 6). For a mini-scaling step 26 such as provided in FIG. 5, the full-gamut-handling capability of this method is unnecessary (and somewhat disfavored as it is more time-consuming) but nevertheless may be used if desired.

The input to this process is a color or array of colors in colorimetric color space in polar coordinates H*L*C*. The H* value is used to select a destination (e.g. printer) hue page. This hue page defines in L*C* space (FIG. 10) the gamut contour followed along three paths: (1) white to black KW, (2) white to full saturation WS, and (3 2392 ) black to full saturation KS.

An intercept point 61 is selected along the L* axis KW. Then a line 62—advantageously but by no means necessarily a straight line—is selected to join that predetermined intercept 61 and the L*,C* point Hsat for full saturation. The line 62 will be called the "scaling axis", and preferably extends beyond the latter point Hsat into the out-of-gamut area.

Next, at least one point is defined along the scaling axis 62 and within, or internal to, the gamut. For the discussion of this subsection and such corresponding appended claims as are addressed to this material, this phrase "within, or internal to, the gamut" encompasses points along the L* axis KW—and also is explicitly to be understood as equivalently encompassing points to the left of the L* axis KW, because such points will be found to serve well for some purposes that will shortly become clear.

Thus one internal-to-the-gamut point may be defined, as a special but particularly advantageous case, coincident with the previously defined intercept 61, as shown. Alternatively one internal-to-the-gamut point may be defined instead along the scaling axis 62 but to the left (not shown) of that point 61.

For purposes of definiteness the internal point thus defined, whether it is the illustrated point 61 or another, will be called a "pivot point". If desired a pivot point may instead be selected along the scaling axis 62 but very slightly to the right of the L* axis; however, for reasons that will shortly be clear such positions are disfavored—particularly if only one pivot point is to be defined.

In any event color points A that are outside the printer gamut are scaled to the gamut boundary by the following procedure. First, a radial line 67 is constructed between the pivot point 61 and the out-of-gamut point A.

Second, the system locates the intersection A' of that radial line 67 with the gamut boundary WS. More generally the system finds the intersection of the radial line 67 with the white-to-saturated or black-to-saturated boundary WS or KS—depending on whether the out-of-gamut point A is lighter or darker than the gamut, respectively.

Third, the system displaces the point A to the intersection point A' just found. The intersection point A' is the scaled point.

Figure 10:
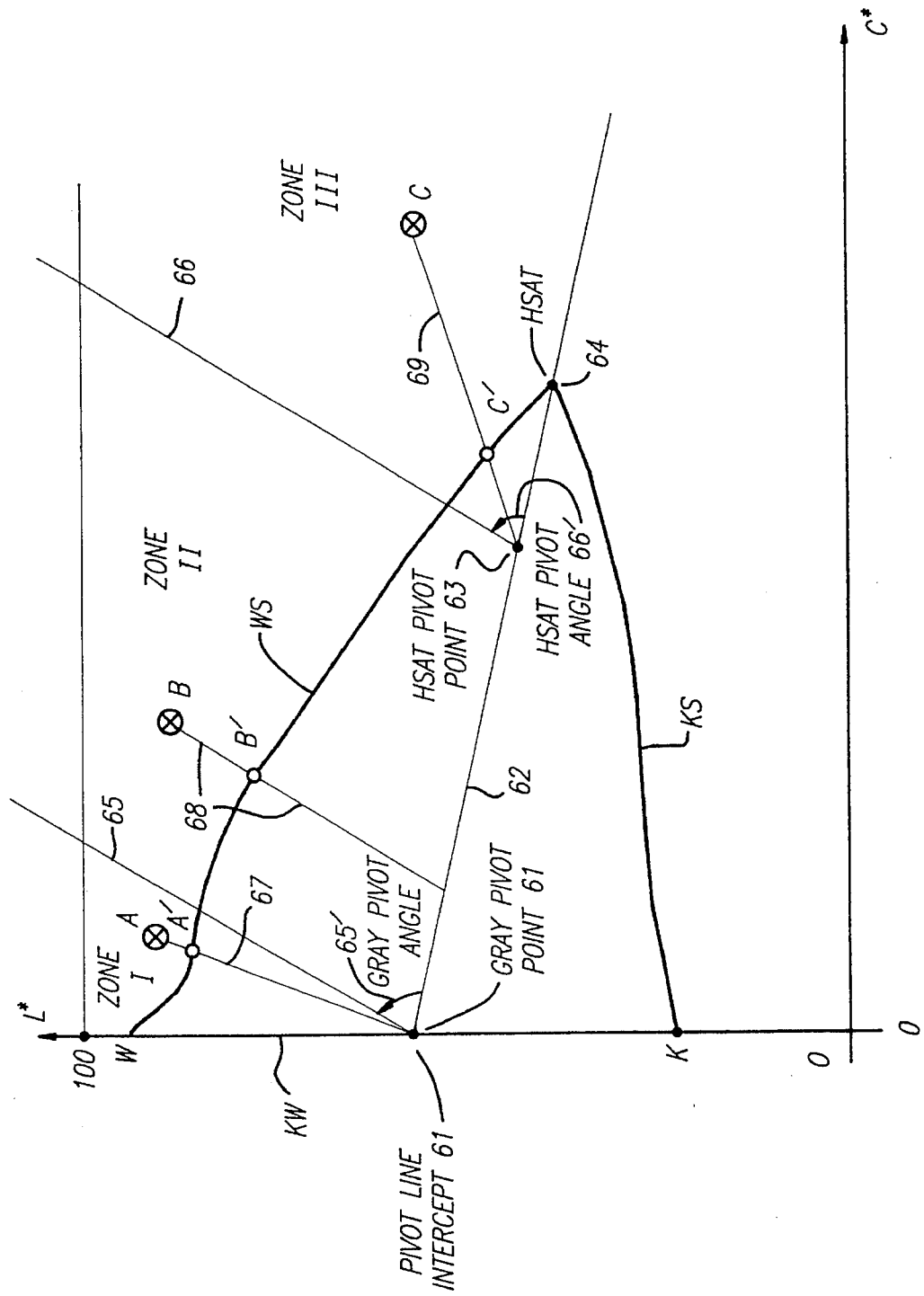
FIG. 10 is a conceptual hue-page diagram showing a preferred form of surface scaling according to the invention.

As can be seen from study of the topmost region in FIG. 10, out-of-gamut points A are allocated by this scaling procedure to various points that are well-distributed along the boundary WS—by virtue of different angular positions, or pivoting, of the radial line 67 about the pivot point (whereby the term "pivot point" is derived). In particular this well-distributed-point property is preserved even for out-of-gamut points that are lighter than (above, in FIG. 10) the maximum-lightness point W of the printer gamut.

Prior systems for scaling along a normal to the gamut boundary WS break down in such regions, and necessarily collect all such above-W points to the single point W. As mentioned in the related-art section of this document, such protocols tend to discard the capability to discriminate between closely related colors in such regions. If this tendency is overcome by special provisions, the result may instead be to sacrifice smoothness or continuity, or both.

The present method, by comparison, provides a smooth, continuous mapping of points of lightness data greater than W—as well as those points for which there exists a normal—to clearly discrete points along the boundary WS, KS. As will be appreciated from study of the drawing, the quality of such mapping depends upon the angle at which the radial line 67 crosses the boundary WS, KS.

More specifically, first the extent to which such mapping appears uniform depends upon that crossing angle. The closer to the normal, the more uniform the mapping—but even crossing at perhaps thirty or forty degrees yet preserves separation of nearby colors to a very respectable extent. Second, the extent to which deep out-of-gamut areas must be mapped into a line segment also depends to some degree on the crossing angle (but also more generally on the gamut geometry): the closer to the normal, the shallower tends to be the area that maps into a line of given length.

For purposes of this subsection and related claims, the "boundary" is to be understood as encompassing, equivalently:

1) the illustrated boundary lines WS and KS; or 2) a relatively shallow or thin margin (not shown) just inside the illustrated boundary lines WS and KS; or 3) the illustrated lines WS and KS in some specified regions, a thin margin in other specified regions.

In cases (2) and (3), the exact location of the intersection point A' of the radial line 67 with the "boundary margin" must be selected—by specifying some additional selection rule—so as to position the point A' within the "margin", but in any event still along the radial line 67.

Colors that are within the printer gamut are not scaled by this process, but simply passed through to the next stage—which is typically processing through a color-match table to extract the correct RGB signal for printing of the given or scaled (as the case may be) color. (If a boundary margin is in use, then the handling of colors initially in and near the boundary margin must be specified by still another scaling rule.)

The method of the invention is readily practiced with just a single pivot point 61. It is also readily practiced with a single pivot point (not shown) to the left of the L* axis—notwithstanding the fact that such a point should be conceptualized as either representing no real color or representing a color at another, opposed hue. In such a mode of practicing the invention, no further pivot point need be defined.

For reasons explained above, however, it is desirable that the radial line 67 cross the boundary WS, KS etc. at angles that are relatively close to (or at least not excessively remote from) the normal. Study of FIG. 10 reveals that this condition fails, with respect to the pivot point 61, for most out-of-gamut points far from the L* axis KW. For this reason, where full capability for handling of out-of-gamut points is desired, additional methodology is preferably added as follows.

The pivot point 61 will here be designated the "gray pivot point"; and a second pivot point 63—for specificity of this discussion designated the "Hsat pivot point"—is defined along the scaling axis 62 near but not at the Hsat point 64. In addition, for definiteness of allocation of out-of-gamut points to the different pivot points (and for other reasons that will become clear momentarily) it is now desirable to designate all colors above the scaling axis 62 as "upper out-of-gamut colors"; and all colors below, "lower out-of-gamut colors".

If the given color is out-of-gamut, then the scaling protocol is selected from at least two procedures—corresponding to scaling radially toward a selected one of the two pivot points 61, 63. In other words, some points A are mapped radially as before toward the gray pivot point 61, whereas other points C are mapped radially in like fashion toward the Hsat pivot point 63.

Preferably, however, the scaling protocol is selected from at least three procedures. They correspond to scaling radially toward a selected pivot point 61, 63 or parallel-line scaling as defined below.

The purpose of this triple-option arrangement is to optimize the crossing-angle considerations which have been introduced above. It also optimizes smoothness and continuity of mappings as between different adjacent out-of-gamut regions.

As study of the drawing reveals, even though reasonably steep crossing angles can be obtained everywhere in the diagram for one or the other pivot point 61, 63, mapping by only the radial method introduced above can lead to anomalies in the relatively extended out-of-gamut region far from both points. Such anomalies can include, in particular, mapping of immediately adjacent initially-out-of-gamut points to widely separated points along the boundary.

Two avoid such problems, two additional lines are defined as shown in FIG. 10: a gray-zone limit line 65 and an Hsat-zone limit line 66. These lines pass through the gray pivot point and Hsat pivot point, respectively, and define three zones for selection of scaling protocol:

In Zones I and III, respectively nearest and furthest from the L* axis KW, scaling is radial toward the gray and Hsat pivot point respectively as already described. In Zone II, between the gray- and Hsat-zone limit lines 65, 66, scaling is to the boundary by displacement instead along a family of parallel lines 68—preferably parallel to one of the above-defined zone limit lines 65, 66.

The limit lines 65, 66 are inclined to the scaling axis 62 at angles denominated the "gray pivot angle" 65' and "Hsat pivot angle" 66', respectively. Once again to avoid mapping closely adjacent input colors to widely separated boundary points, it is preferable to make these two angles 65', 66' the same—so that the gray-zone and Hsat-zone limit lines, and the family of lines 68 between them, are all mutually parallel.

Whether or not they are the same, the two gray and Hsat pivot angles 65', 66' are preferably selected to yield crossings with the boundary WS, KS at angles reasonably close to normal within all three zones.

Lower-gamut colors are scaled in a corresponding fashion, preferably with definition of additional, analogous zones. To optimize crossing angles etc. separately for the upper- and lower-out-of-gamut colors, additional pivot points (not shown) may be defined along the same scaling axis 62 or another scaling axis (not shown).

If preferred, however, the same points may be used for both the upper and lower regions. If an additional scaling axis is defined, only one or the other of the two axes should be selected for definiteness in allocation of colors to the upper- or lower-out-of-gamut regions.

COLOR RELATIONS CASCADED/BRIDGED THROUGH PERCEPTUAL SPACE

Figure 11:
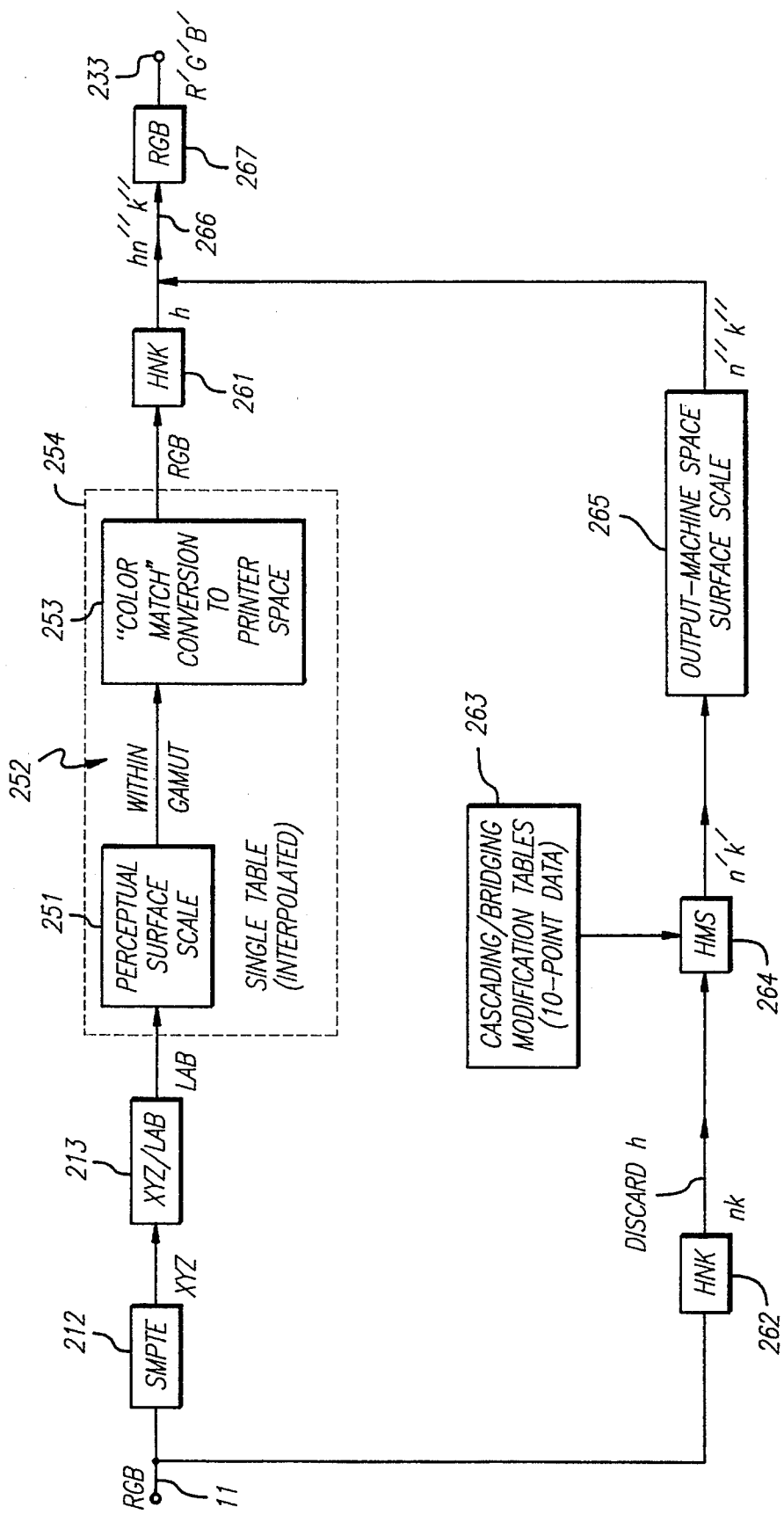
FIG. 11 is a block or flow diagram like FIGS. 5 and 6 but showing a different way of interrelating input-device with output-device gamuts according to the invention, and in particular without using the normalized-superposition embodiments of FIGS. 1 through 4—but using instead cascaded or bridging tabulations that bridge or interrelate input- and output-device signals through reference to the implications of both device signals in perceptual space.
Figure 12:
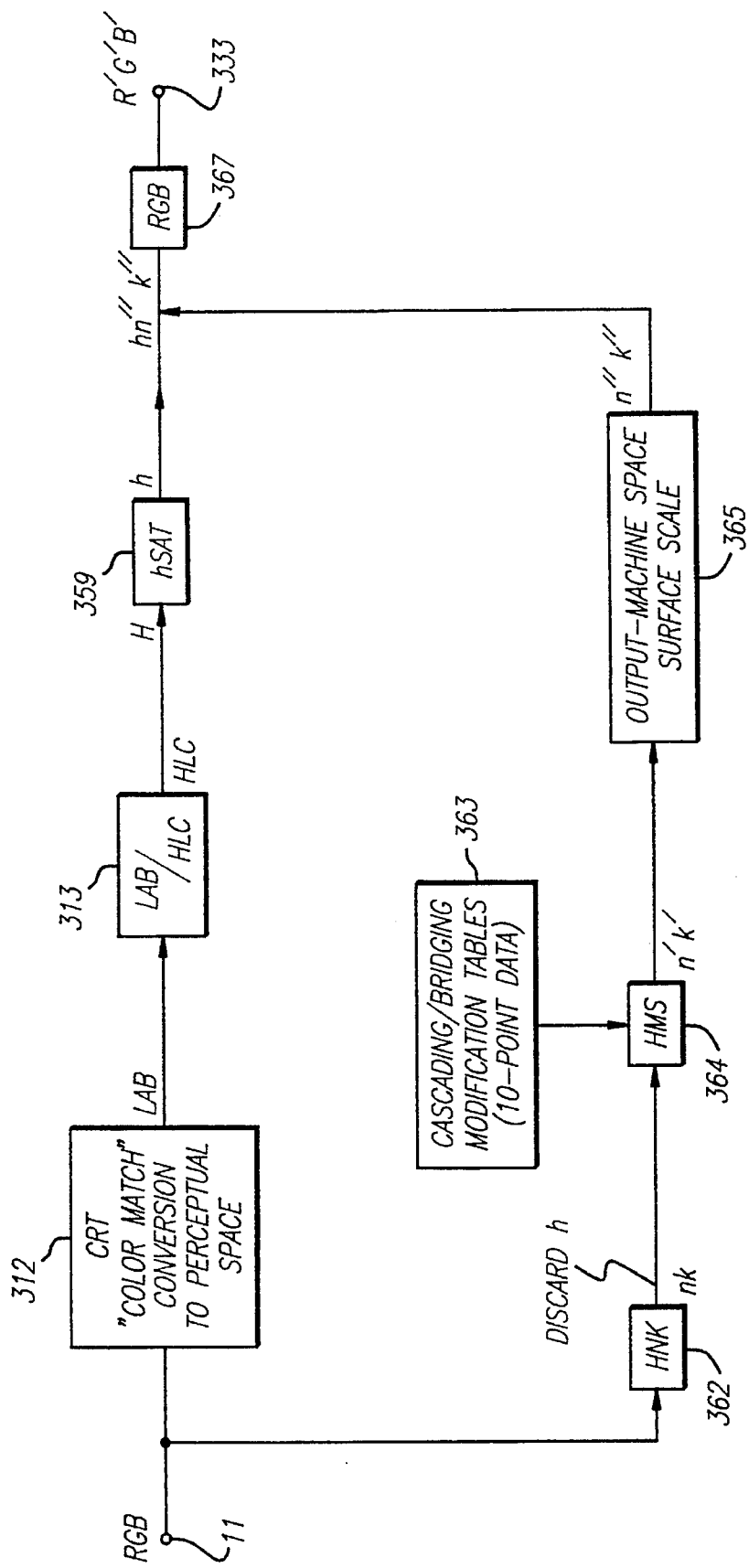
FIG. 12 is a like diagram showing another system for using the cascaded or bridging tables.

FIGS. 11 and 12 portray two preferred embodiments of the invention that employ yet a third HMS operational mode that is different from those discussed in subsection 1 above; this third mode does not employ either form of the color-element superposition technique. The systems of FIGS. 11 and 12 are nevertheless broadly related to the FIG. 6 system—in that all three possess the novel overall effect of mapping two color-presentation devices together through a perceptual space.

The two systems now under discussion use a common handling of the fraction-colorant n and fraction-black k variables of HPG or HNK space (introduced in the previously mentioned parent patent document). In other words the bottom path 262–265, 362–365 as drawn is common to FIGS. 11 and 12. These two systems exemplify, however, different ways of dealing with the hue H variable.

In both these systems the input. RGB signal is directed to a conversion module 262, 362 which derives from that signal a corresponding signal—still in input-device space—expressed in terms of the HPG or HNK system: namely HPG hue h and the nk variables stated just above. In this lower path of both drawings the h data are discarded, leaving only n and k.

Next the nk point passes to an HMS conversion block 364, which performs a novel mapping into a corresponding point n'k' in output-device space: the character of this mapping is controlled by the cascading or bridging tables 363, which are generated in a manner described in the following paragraphs. The resulting output-device control signal n'k' is subjected to surface scaling 365—which may for example take the form of the radial scaling described in the preceding subsection 2 of this detailed description—and the resulting scaled data n"k" are combined with the separately processed hue to drive a conversion block 367 which develops new R'G'B' values for application 333 to a printer or other output device. In this development it is assumed that:

a) the basic system consists of a personal computer with a color CRT monitor and a color printer, and b) various characterizations are available for the CRT and printer which enable transformations between CRT RGB and CIELAB, CIELAB to printer RGD, and finally from CRT RGB to printer RGB.

These systems also use both the Cartesian and polar forms of CIELAB used (CIELAB and CIEHLC). The variables are:

h HPG hue;

n fraction colorant, or in this case percentage colorant (range, zero to one hundred);

k fraction black;

H* hue angle (zero to three hundred sixty degrees) of CIEHLC, derived from CIE a* and b*;

L* lightness (zero to one hundred) from CIEHLC and CIELAB; and

C* chroma (zero to X, where X varies with to hue and lightness but for printed hardcopy in general is less than one hundred twenty).

(a) Processing to obtain output hue—This method requires three lookup tables. The first, used only in the upper path as to each of FIGS. 11 and 12, is a table that enables transformation between CRT RGB and printer RGB.

As will be seen, this portion of the general method (the upper path as drawn) is different for the two specific embodiments under discussion FIGS. 11 and 12. Both forms, however, implement an appearance match from CRT to overhead transparency.

In both forms only hue found through this part of the system is used. The corresponding nk point in the printer hue page being discarded.

The upper path in FIG. 11 is nearly the same as that in FIG. 5—the only differences being that:

1) the output of the consolidated table 254 (perceptual surface scaling and color-match conversion) here is converted from RGB to hnk before further use, and
2) the recombination point for the upper and lower paths here follows that conversion to hnk, rather than preceding the consolidated table 254.

The system illustrated in the upper FIG. 11 path does introduce one feature which leaves some room for refinement, namely that the input RGB signals are converted to perceptual signals by the mathematical models 212, 213 2 shown—which as mentioned earlier take no account of actual CRT behavior.

The upper path in FIG. 12 improves upon that of FIG. 11 by accounting for the specific characteristics of the CRT involved. This implementation takes advantage of specific CRT characterization data made available through use of a special software utility offered by the Hewlett Packard Company as part of the Windows® printer-driver for a printer offered commercially as the DeskJet® 1200C.

This utility is disclosed in the above-identified patent document filed in the names of Winter et al. The utility enables the user to perform a series of interactive tests to determine color characteristics of the CRT and video display card to be used with the printer.

Thus the CRT color match 312 in FIG. 12 produces a perceptual output LAB that should bear closely accurate relation to the color of the CRT screen as operated. The quality of the match will depend upon several variable factors, including the degree of care taken by the operator who runs the above-mentioned utility.

The match quality as viewed by people other than the particular user who operates the screen-calibration utility will also be governed in part by the pschophysiological color-vision capabilities or characterization of that particular human operator—in relation to the capabilities and characterizations of the other viewers.

At any rate, results of running the calibration utility are collected as a table within the FIG. 12 color-match module 312. In later operation, each given input color is applied as a key to this table, and the module 312 responds with an output in LAB units as shown.

This output is applied to a conversion stage 313 which emits corresponding values in HLC units. The L and C data in turn are discarded, and the M value advantageously converted by an hSAT table 359 into hue H, here a device-space variable, expressed in units of the HPG system.

As initially implemented, the embodiment of FIG. 11 also proceeds on the assumption that chroma as a function of CRT n behaves the same for all hues and lightnesses. A representative template function—such as for instance C-std(n)—may be generated by resort to values plotted for particular selected values of, for example, fraction-black k. This may be accomplished by, for instance, plotting C-ws(n) along the k=0 (top, as conventionally drawn) boundary line of a machine-space hue page.

A correction is preferably added to adjust chroma based on the amount of black used in the color. This may be accomplished by, for example, both plotting C-ws(n) as above and plotting C-ks(n) along the bottom boundary line too—and then interpolating between the two C(n) values C-ws(n) and C-ks(D) for each input machine-space hue-page point n,k.

(b) Processing to obtain output fraction-colorant and fraction-black—The second and third tables provide information about how to modify the amount or fraction of color and black. They are an "n Modification Table" and a "k Modification Table", and are used only in the bottom path in each of FIGS. 11 and 12; as noted elsewhere the bottom path is common to these two embodiments.

Figure 14:
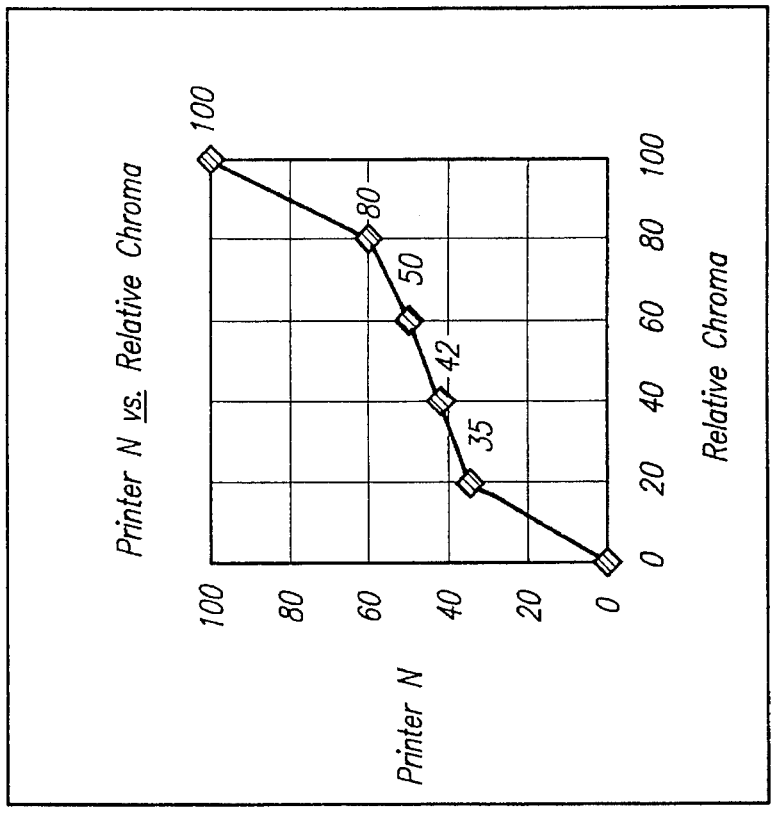
FIG. 14 is a representative graph of relative chroma C* as a function of printer N, for a particularly assumed printer.
Figure 13:
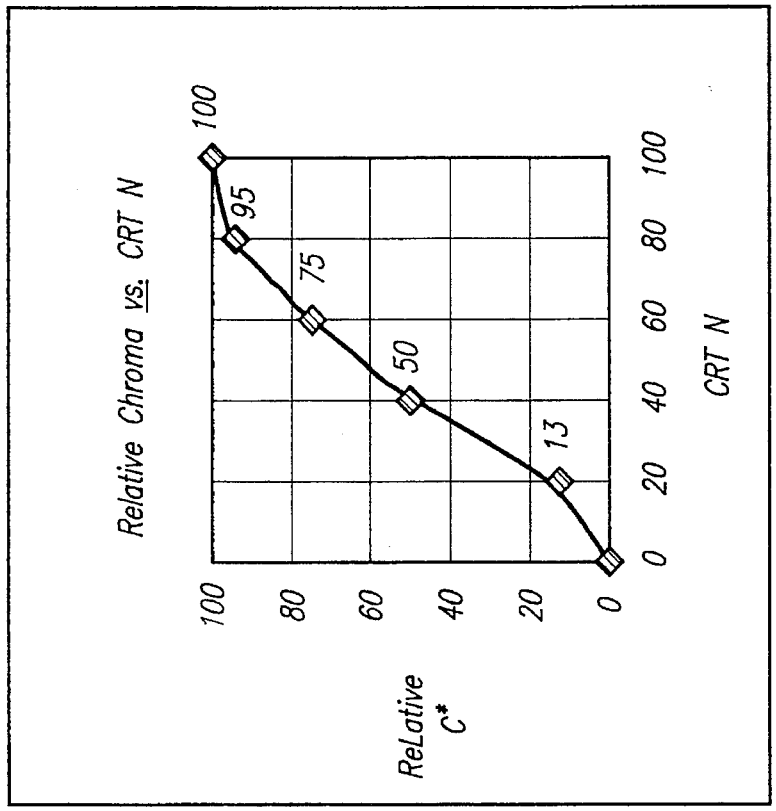
FIG. 13 is a representative graph of relative chroma C* as a function of CRT N, for a particularly assumed CRT.

The n Modification Table is constructed from two separate tables. The first (FIG. 13) maps CRT n or amount of color to a relative measure of $C^*$ (as measured from white to fully saturated red). The second table (FIG. 14) maps relative $C^*$ to printer n (again, as measured from white to fully saturated red) for a hypothetical printer.

Figure 15:
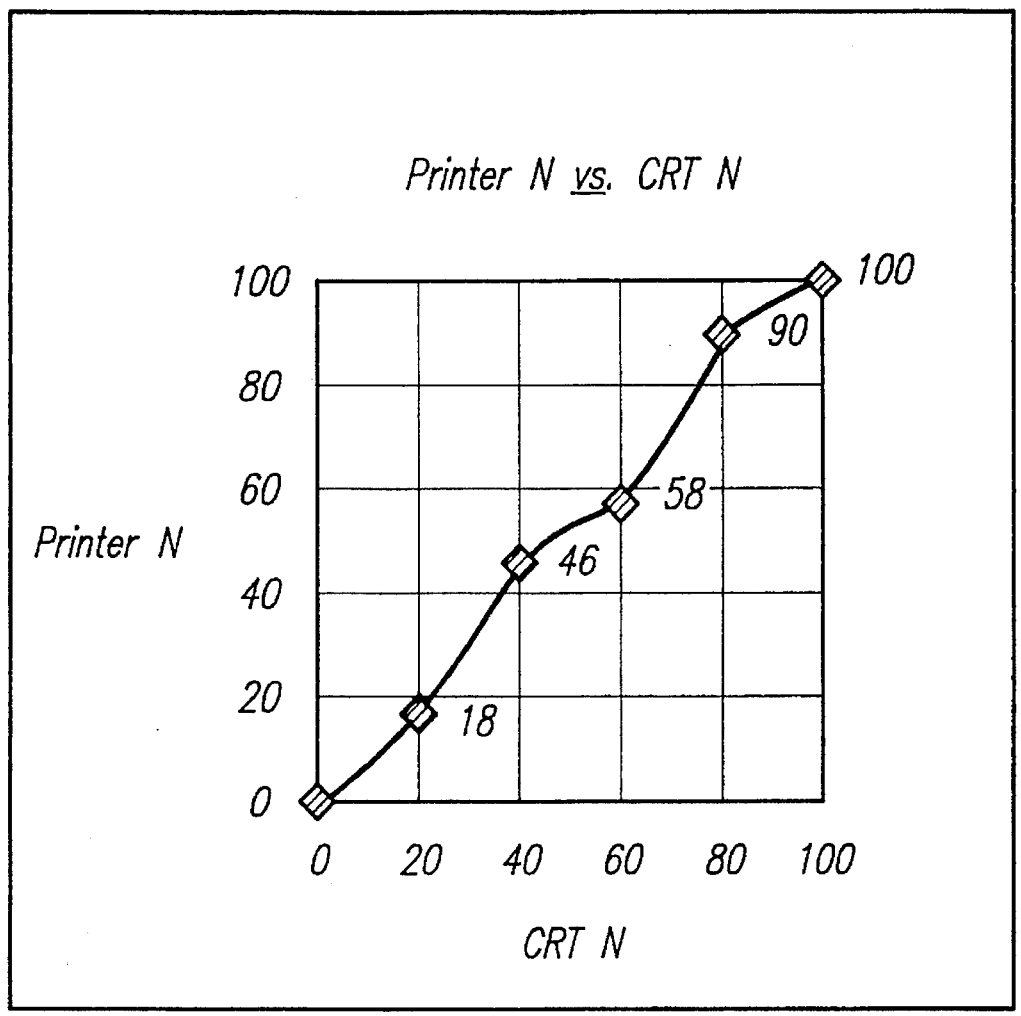
FIG. 15 is a graph of printer N as a function of CRT N, for the same particularly assumed CRT and printer corresponding to the bridging or cascaded tables mentioned above.

Both CRT $C^*$ and printer $C^*$ have been normalized to a scale of zero through one hundred percent to provide a relative measure of chroma. The effects of these two tables are merged to provide a CRT-n-to-printer-n Modification Table (FIG. 15), for the same hypothetical printer.

Similarly, the k Modification Table is generated from two separate tables, one mapping CRT k to $L^*$, and another mapping printer $L^*$ to printer k. Again, these two tables are merged to provide a CRT-k-to-printer-k Modification Table.

Steps for color processing for this method are:

1) process the source CRT RGB color through the color-matching map to derive the appearance-matched color for the printer;
2) convert this value to hnk (h-mapped, n-mapped, k-mapped);
3) convert original RGB color to hnk (h-org, n-org, k-org);

compute n' and k' based on n-org, k-org and the n/k Modification Tables;

5) adjust the results if needed to ensure that n'+k'≦100%—unless the printer system in use is capable of overprinting color and black together;
6) construct a new hnk color from n', k' and h-mapped; and
7) convert this value to RGB to drive the printer.

The FIG. 11 system can be consolidated to a single table.

4. CONCLUSION

The specification, drawings and lookup tables of the previously identified parent patent document exemplify, to one skilled in the art, the foregoing fundamental principles.

While various examples and embodiments of the invention have been shown and described, it will be appreciated by those skilled in the art that the spirit and scope of the invention are not limited to the specific description and drawings herein, but extend to various modifications and changes all as set forth in the following claims.

We claim:

1. A method for printing, with a color printer that has an at least partly known color gamut, a color image portion based on initial color specifications for use in a display device that has an at least partly known color gamut; said method comprising the steps of:

performing on such initial specifications a transformation that includes the effect of performing these sub-steps:
  interpreting relative-position values of lightness and chroma, within a display-device hue page that is part of the display-device gamut in a perceptual space, as also being relative-position values of lightness and chroma of a corresponding hue page of the printer gamut in said same perceptual space, and
  using said relative-position values of lightness and chroma of the printer gamut, to derive printer signals; and then applying the printer signals, to control printing of the particular image portion by the printer.

2. A method for printing, with a color printer that has an at least partly known color gamut, a color image composed of plural image portions and based on initial color specifications for use in a display device that has an at least partly known color gamut; said method comprising the steps of:

receiving or developing, for a selected particular portion of the image, the initial color specifications expressed in terms of a hue page that is part of the display-device gamut, in a color space related to operation of the display device;

performing on selected ones of said specifications, corresponding to the selected particular image portion, a transformation that has the effect of performing these substeps:

based on said selected specifications in terms of the display-device hue page and display-device color space, determining corresponding values of hue, lightness and chroma expressed in terms of absolute position within a display-device hue page in a perceptual color space, finding hue-page characterizations for the display-device and printer hue pages, expressed in the same said perceptual space, for said determined hue expressed in the perceptual space, using said found characterization of the display-device hue page, and also using said found absolute-position values of lightness and chroma in the display-device hue page expressed in said perceptual space, to find corresponding first intermediate values of lightness and chroma expressed in terms of relative position within the display-device hue page and in said perceptual space, employing said found characterization of the printer hue page, and also employing said first intermediate relative-position values of lightness and chroma, interpreted as also being relative-position values of lightness and chroma in said perceptual space within the printer hue page that is part of the printer gamut, to find second intermediate values of lightness and chroma expressed in terms of absolute position in said perceptual space within the printer hue page, based upon the hue and the second intermediate relative-position values, all expressed in said perceptual space, obtaining new color specifications expressed in terms of the printer hue page and a color space used for operation of the printer, for the particular image portion; and then applying the new color specifications, expressed in terms of the printer hue page and said printer space, to control printing of the particular image portion by the printer.

3. The method of claim 2, wherein:

the specification-receiving or -developing step comprises receiving or developing, for the particular image portion, said initial specifications in the form of signals for respectively controlling red, green and blue intensities.

4. The method of claim 2, wherein:

the obtaining substep comprises defining said new specifications in the form of printer signals for respectively controlling cyan, magenta, yellow and black colorant amounts, for the particular image portion; and the applying step comprises applying the printer signals to control printing of the particular image portion by the printer.

5. The method of claim 2, wherein:

the obtaining substep comprises defining said new specifications in the form of printer signals for respectively controlling red, green and blue intensities, for the particular image portion; and the applying step comprises, within the printer:

applying the printer signals to develop further signals for controlling cyan, magenta, yellow and black colorant amounts, for the particular image portion, and applying the further signals to control printing of the particular image portion by the printer.

6. The method of claim 2, wherein:

the specification-receiving or -developing step comprises receiving or developing said initial specifications in the form of signals for respectively controlling red, green and blue intensities;

the obtaining substep comprises defining said new specifications in the form of printer signals for respectively controlling cyan, magenta, yellow and black colorant amounts; and the applying step comprises applying the printer signals to control printing of the particular image portion by the printer.

7. The method of claim 2, wherein:

the specification-receiving or -developing step comprises receiving or developing said initial specifications in the form of signals for respectively controlling red, green and blue intensities;

the obtaining substep comprises defining said new specifications in the form of printer signals for respectively controlling red, green and blue intensities; and the applying step comprises, within the printer:

applying the printer signals to develop further signals for controlling cyan, magenta, yellow and black colorant amounts, for the particular image portion, and applying the further signals to control printing of the particular image portion by the printer.

8. The method of claim 2, wherein:

the first-values-employing substep comprises adjusting said relative-position value of lightness in proportion to the difference between lightness values at the respective maximum-vividness points of the printer and display-device hue pages, respectively.

9. The method of claim 8, wherein:

the first-values-employing substep further comprises offsetting said relative-position value of lightness based on at least one difference between lightness values at lightness-extremum points of the printer and display-device hue pages, respectively.

10. The method of claim 2, wherein:

the transformation-performing step achieves said effect without directly using raw characterizing data for hue expressed in terms of either the display-device or printer hue page.

11. The method of claim 2, wherein:

the transformation-performing step comprises referring to at least one lookup table to find:

for the determined hue, the extrema of lightness- and vividness-related parameters on the display-device hue page, and for that same hue, the extrema of lightness- and vividness-related parameters on the printer hue page.

12. The method of claim 11, wherein:

the transformation-performing step further comprises referring to a lookup table to find the printer hue page corresponding to the determined hue.

13. The method of claim 11, wherein:

the transformation-performing step proceeds by referring to at least one lookup table to find:
the coordinates of the initial specifications expressed in terms of a normalized display-device hue page, and normalization-reversed corresponding coordinates expressed in terms of the actual printer hue page.

14. The method of claim 2, wherein:

the hue-page characterization-finding step comprises finding approximations to the respective shapes of the display-device and printer hue pages.

15. The method of claim 14, wherein:

the approximation-finding step comprises finding vertex coordinates for straight-line-bounded figures representing respective simplified shapes of the display-device and printer hue pages.

16. The method of claim 15, wherein: the straight-line-bounded figures are triangles.

17. The method of claim 16, wherein, for the determined hue, the vertex coordinates represent respectively:

the maximum-saturation point;

the maximum-lightness point; and;

the minimum-lightness point.

18. A set of lookup tables for use in printing, with a color printer that has an at least partly known color hue page that is part of the printer gamut, a color image based on input color specifications for use in a display device that has an at least partly known color hue page that is part of the display-device gamut:

said set of lookup tables being prepared so that the tabulated values correspond to performing steps comprising:

interpreting relative-position values of lightness and chroma, within a display-device hue page that is part of the display-device gamut in a perceptual space, as also being relative-position values of lightness and chroma within a corresponding printer hue page in said perceptual space;

employing said relative-position values within the printer hue page to derive printer signals; and then applying the printer signals to control printing by the printer.

19. The set of lookup tables of claim 18, wherein: the tabulated values correspond to performing additional steps comprising:

determining values of hue, lightness and chroma, expressed in terms of absolute position within the display-device hue page in a perceptual color space, that correspond to the input specifications, finding display-device- and printer-hue-page characterizations, expressed in said perceptual space, for said hue expressed in perceptual space, and using said found display-device- and printer-hue-page characterizations, and also using the found absolute-position values of lightness and chroma expressed in said perceptual space, to find corresponding first intermediate values of lightness and chroma, expressed in terms of relative position in said perceptual space within the display-device hue page;

wherein said printer-hue-page relative-position-value employing step comprises:

using said relative-position values of lightness and chroma within the printer hue page in said perceptual space, produced by said interpreting step, to find second intermediate values of lightness and chroma expressed in terms of absolute position in said perceptual space within the printer hue page, and based upon the hue and the second intermediate relative-position values, all expressed in said perceptual space, obtaining new color specifications expressed in terms of the printer hue page and a color space used for operation of the printer; and wherein said new color specifications comprise said printer signals.

20. A method for printing, with a color printer that has an at least partly known color hue page that is part of the printer gamut, a color image composed of plural image portions and based on color specifications for use in a display device that has an at least partly known color hue page that is part of the display-device gamut; said method comprising the steps of:

receiving or developing, for a particular image portion, display-device signals for controlling red, green and blue intensities for each image portion, in operation of the display device;

performing on said display-device signals a transformation that has the effect of performing these substeps:

determining values of hue, lightness and chroma, expressed in terms of absolute position within a display-device hue page that is part of the display-device gamut in a perceptual color space, that correspond to the signals, finding display-device- and printer-hue-page characterizations, expressed in said perceptual space, for said hue expressed in perceptual space, using said found display-device-hue-page characterization to find first intermediate values of lightness and chroma, expressed in terms of relative position in said perceptual space within the display-device hue page, that correspond to the found absolute-position values of lightness and chroma expressed in said perceptual space, employing the printer-hue-page characterization, and also the first intermediate relative-position values of lightness and chroma, interpreted as also being relative-position values of lightness and chroma in said perceptual space within a corresponding printer hue page that is part of the printer gamut, to find second intermediate values of lightness and chroma expressed in terms of absolute position in said perceptual space within the printer hue page, based upon the hue and the second intermediate absolute-position values, all expressed in said perceptual space, obtaining printer signals for controlling quantities of cyan, magenta, yellow and black colorants for each image portion, in operation of the printer; and then applying the printer signals to control printing of the particular image portion by the printer.

21. The method of claim 20, wherein:

the obtaining step comprises, outside the printer, defining printer signals for controlling red, green and blue intensities; and the applying step comprises, within the printer:

processing the printer signals to develop further signals for controlling quantities of cyan, magenta, yellow and black colorants, and applying the further signals to control printing of the particular image portion by the printer.

* * * * *